United States Patent
Lele et al.

(10) Patent No.: US 8,194,531 B2
(45) Date of Patent: Jun. 5, 2012

(54) METHODS FOR TRANSMITTING AND RECEIVING A MULTICARRIER SIGNAL, CARRYING OUT A CHANNEL ESTIMATION, AND CORRESPONDING DEVICES AND COMPUTER PROGRAM PRODUCTS

(75) Inventors: Chrislin Lele, Saint Jacques (FR); Jean-Philippe Javaudin, Rennes (FR); Rodolphe Legouable, Cesson Sevigne (FR); Pierre Siohan, Rennes (FR)

(73) Assignee: France Telecom, Paris (FR)

( * ) Notice: Subject to any disclaimer, the term of this patent is extended or adjusted under 35 U.S.C. 154(b) by 162 days.

(21) Appl. No.: 12/373,458

(22) PCT Filed: Jul. 12, 2007

(86) PCT No.: PCT/FR2007/051653
§ 371 (c)(1),
(2), (4) Date: Jan. 12, 2009

(87) PCT Pub. No.: WO2008/007030
PCT Pub. Date: Jan. 17, 2008

(65) Prior Publication Data
US 2009/0316569 A1    Dec. 24, 2009

(30) Foreign Application Priority Data

Jul. 12, 2006   (FR) ...................................... 06 06375
Nov. 17, 2006   (FR) ...................................... 06 10104

(51) Int. Cl.
*H04J 11/00*   (2006.01)
*H04J 1/00*    (2006.01)
*H03D 3/18*    (2006.01)

(52) U.S. Cl. ......... 370/206; 370/210; 370/343; 375/327

(58) Field of Classification Search ........................ None
See application file for complete search history.

(56) References Cited

U.S. PATENT DOCUMENTS
2004/0032909 A1   2/2004   Gonzales et al.
(Continued)

FOREIGN PATENT DOCUMENTS
WO   02/25883 A1   3/2002
WO   02/25884 A1   3/2002

OTHER PUBLICATIONS

Javaudin, P. et al, Pilot-aided channel estimation for OFDM/OQAM, VTC 2003-Spring, The 57th IEEE Semiannual Vehicular Technology Conference—Proceedings Jeju, Korea, Apr. 22-25, 2003, IEEE Vehicular Technology Conference New York, NY: IEEE, US, vol. 4 of 4, Conf 57, Apr. 22, 2003.

(Continued)

*Primary Examiner* — Donald Mills
*Assistant Examiner* — Samina Choudhry
(74) *Attorney, Agent, or Firm* — David D. Brush; Westman, Champlin & Kelly, P.A.

(57) ABSTRACT

A method is provided for receiving a received signal corresponding to a multicarrier signal transmitted by at least one transmitter via a transmission channel. The multicarrier signal is formed by a temporal succession of symbols consisting of a set of data elements including informative data elements with real values, and pilots for at least some of the symbols. Due to groups of at least two pilots being respectively located in an adjacent region in the time/frequency space, the reception method includes a step of extracting at least two complex values corresponding the pilots of the group of the adjacent region, once they have passed through the transmission channel, and a step of estimating the transmission channel in the adjacent region on the basis of the complex values. The modulation used is the type of OFDM OQAM.

16 Claims, 4 Drawing Sheets

U.S. PATENT DOCUMENTS

2004/0062191 A1     4/2004   Lacroix-Penther et al.
2004/0246886 A1*   12/2004   Mege et al. .................. 370/203

OTHER PUBLICATIONS

French Search Report of foreign counterpart Application No. FR 06/06375 filed on Jul. 12, 2006.

International Search Report of foreign counterpart Application No. PCT/FR2007/051653 filed Jul. 12, 2007.

International Preliminary Report on Patentability of foreign counterpart Application No. PCT/FR2007/051653.

* cited by examiner

METHODS FOR TRANSMITTING AND RECEIVING A MULTICARRIER SIGNAL, CARRYING OUT A CHANNEL ESTIMATION, AND CORRESPONDING DEVICES AND COMPUTER PROGRAM PRODUCTS

CROSS-REFERENCE TO RELATED APPLICATIONS

This Application is a Section 371 National Stage Application of International Application No. PCT/FR2007/051653, filed Jul. 12, 2007 and published as WO 2008/007030 on Jan. 17, 2008, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The field of the disclosure is that of the transmission and broadcasting of digital information, especially at high bit rates, on a limited frequency band.

More specifically, the disclosure pertains to a technique for sending and receiving a multicarrier signal through which an estimation of the transmission channel, for example in a radiomobile environment, can be obtained in reception.

The technique of the disclosure is particular well suited to the transmission of multicarrier signals that have undergone an OFDM/OQAM (Orthogonal Frequency Divisional Multiplexing/Offset Quadrature Amplitude Modulation) type of modulation or a BFDM/OQAM (Biorthogonal Frequency Division Multiplexing/OQAM) type modulation for which the carriers are shaped by a prototype function.

BACKGROUND OF THE DISCLOSURE

1. Multicarrier Modulations
1.1 OFDM Modulations

OFDM (Orthogonal Frequency Divisional Multiplex) type multicarrier modulations are known today. A modulation technique of this kind brings an efficient solution to the problem of the broadcasting information, especially for wired or wireless multiple-path channels.

Consequently, the OFDM multicarrier modulation technique has been chosen in several standards and specifications for applications in wired transmission, for example ADSL (Asymmetric Digital Subscriber Line) or PLC (Power Line Communication) or wireless transmission applications, for example systems of the DAB (Digital Audio Broadcasting), DVB-T (Digital Video Broadcasting-Terrestrial) or WLAN (Wireless Local Area Network) type.

However, the rectangular shaping of a signal made by an OFDM modulator has the drawback of poor frequency location.

Consequently, alternative solutions have been proposed, leading to the creation of multicarrier modulation systems in which the signal is shaped by functions known as prototype functions, enabling better frequency location to be obtained.

Indeed, the set of carriers of a multicarrier modulation forms a multiplex and each of the carriers of this multiplex can be shaped by means of a same prototype function, referenced g(t), which characterizes the multicarrier modulation.

1.2 OFDM/OQAM Modulations

Thus, one solution proposed consists in replacing a QAM (Quadrature Amplitude Modulation) implemented on each of the carriers by a modulation which offsets the real and imaginary parts of the complex symbols to be transmitted by a half symbol time, for two successive carrier frequencies.

This alternation leads to an OFDM/OQAM type multicarrier modulation. This approach makes it possible especially to obtain the desired conditions of orthogonality with prototype filters that are not necessarily rectangular in shape.

Indeed, the temporal offset introduced by OQAM modulation relaxes the constraints of orthogonality and more generally those of biorthogonality. This class of modulation thus offers a wider choice of prototype functions than the simple rectangular prototype function of an OFDM modulation.

Thus, depending on the type of transmission channel considered for a given application, for example the radiomobile or powerline communication (PLC) channel, it is possible to choose prototype functions appropriate to the types of distortion encountered. In particular, it is preferable to choose prototype functions showing higher frequency selectivity than the cardinal sine used in OFDM modulation, especially in radiomobile channels, to overcome the frequency dispersion due to the Doppler effect or in a PLC channel to withstand narrow-band noise phenomena with greater efficiency and generally to meet the frequency specifications of transmission masks with greater ease.

OFDM/OQAM modulation is therefore an alternative to classic OFDM modulation, relying on a judicious choice of the prototype function modulating each of the carriers of the signal which need to be well located in the time/frequency space.

In particular, FIG. 1 illustrates a time/frequency representation of the real-value data elements transmitted by OFDM/OQAM modulation and of the complex-value data elements transmitted by classic OFDM modulation without any guard interval, an OFDM/QAM complex value symbol or OFDM/OQAM real value symbol being formed by a set of data elements at a given point in time t. Furthermore, each time/frequency location bears a carrier frequency, called a sub-carrier or directly a carrier here below in the description.

In this FIG. 1, the triangles at a given point in time t represent the complex-value data elements of an OFDM/QAM symbol. The circles and asterisks shown at a given point in time t for their part represent the real-value data elements of an OFDM/OQAM symbol. For example, for two successive real-value OFDM/OQAM symbols, the circles correspond to the real part and the asterisks to the imaginary part of a complex symbol coming from a QAM constellation which it is sought to transmit by using an OFDM/OQAM modulation.

Indeed, for a complex type of classic OFDM modulation, the real and imaginary parts of a complex value coming from the QAM constellation are transmitted simultaneously, at intervals of every symbol time period $T_u$; however, in a real type of OFDM/OQAM modulation, the real and imaginary parts are transmitted with a temporal offset of one complex half symbol time ($T_u/2$).

It can be seen in FIG. 1 that the spectral efficiency of the OFDM/OQAM is identical to that of classic OFDM without any guard interval. Indeed, if $v_0$ denotes the spacing between two adjacent carriers of the multiplex and $\tau_0$ denotes the temporal spacing between two real-value symbols, the following are transmitted for a same inter-carrier spacing $v_0$:

in OFDM/OQAM, one real value per carrier at every time slot $\tau_0$;

in classic OFDM without guard interval, one complex value (i.e. two real values) every $2 \times \tau_0 = T_u$.

In other words, the spectral efficiency of OFDM/OQAM is $(T_g+2\tau_0)/2\tau_0$ times greater than that of classic OFDM with a guard interval of a duration $T_g$.

1.3 BFDM/OQAM Modulation

Furthermore, if we choose to have demodulation functions on the reception side that are not necessarily the conjugate functions of the prototype functions used in transmission, it is possible by using the property of biorthogonality, to generalize OFDM/OQAM to the BFDM/OQAM modulation technique.

The offset principle, related to the OQAM family is strictly identical in the context of a BFDM/OQAM type modulation. Consequently, FIG. 1 can also be applied to BFDM/OQAM type modulations.

More specifically, the value of BFDM/OQAM type modulation is that, for a given length of prototype filter, it enables a reduction in the delay due to the transmission system.

As indicated here above, the BFDM/OQAM modulation technique, just like the OFDM/OQAM modulation technique, transmits real-valued symbols at a rate that is twice the rate at which the OFDM transmits complex-value symbols. Consequently, these two modulations have in principle the same spectral efficiency.

More specifically, the BFDM/OQAM signal can be represented in baseband in the following form:

$$s(t) = \sum_n \sum_{m=0}^{M-1} a_{m,n} \underbrace{g(t-n\tau_0)e^{j2\pi m v_0 t} e^{j\phi_{m,n}}}_{g_{m,n}(t)}, \quad (1)$$

with:

$a_{m,n}$ the real data elements to be transmitted on a carrier m at the instant n;

M the number of carrier frequencies (necessarily an even number);

g the prototype function used by the modulator;

$\tau_0$ the duration of a BFDM/OQAM symbol;

$v_0$ the inter-carrier spacing;

$\phi_{m,n}$ is a phase term chosen so as to obtain a real part/imaginary part alternation enabling the orthogonality or more generally biorthogonality to be obtained.

Indeed, in the biorthogonal case, the demodulation base at reception may be different from that of transmission, and can be expressed in the following form:

$$f_{m,n}(t) = f(t-n\tau_0)e^{j2\pi m v_0 t} e^{j\phi_{m,n}} \quad (2)$$

The condition of biorthogonality can then be expressed in the following form:

$$\langle g_{m,n}, f_{m',n'} \rangle_R = \Re\left\{ \int_{-\infty}^{\infty} g_{m,n}(t) f_{m',n'}^*(t)\, dt \right\} = \delta_{m,m'} \delta_{n,n'} \quad (3)$$

where: $\langle , \rangle_R$ designates the real scalar product and $\Re\{\ \}$ designates the real part.

However, one drawback of BFDM/OQAM (or OFDM/OQAM) type modulation techniques is that the condition of biorthogonality (or orthogonality) is obtained only for real values of symbols to be transmitted. This raises a problem of estimation at reception, and especially of estimation of the transmission channel, in as much as the symbols received are complex symbols.

2. The Transmission Channel

Here below, a brief description is given of the characteristics of a transmission channel, especially in a radiomobile environment, and of the techniques of estimation of such a channel. It may be recalled indeed that the method for shaping an electrical signal from the information to be transmitted depends on the conditions in which such a signal is transmitted.

2.1 Characteristics of the Transmission Channel

In a radiomobile environment, the transmitted wave, in its journey, undergoes numerous reflections and the receiver therefore receives a sum of delayed versions of the sent signal. Each of these versions is attenuated and phase shifted randomly. This phenomenon known as "delay spread" generates inter-symbol interference (ISI). The term ISI is understood to mean especially interference between temporal symbols and/or between carriers. For example, in an urban type of environment, the delay spread is in the range of some microseconds or less.

Since the receiver (for example a motorist's mobile radio telephone) is assumed to be moving, the effect known as the Doppler effect also acts on each path, resulting in a shift in the frequency of the received spectrum that is proportional to the speed of movement of the mobile.

The combined action of these effects is expressed in the form of a non-stationary channel having profound fading effects at certain frequencies. A channel of this kind is qualified especially as a frequency-selective channel. In certain applications, which are particularly worthwhile in the context of the present invention, the transmission band has a width greater than that of the coherent band of the channel (i.e. the band for which the frequency response of the channel may be considered to be constant over a given period of time). Fading phenomena therefore appear in the band, i.e. at a given point in time, certain frequencies are highly attenuated.

To overcome these different phenomena (due to the ISI and to the Doppler effect), it has been envisaged in OFDM type systems to add a guard interval during which no payload information is transmitted so as to ensure that all the pieces of information received come from a same symbol. In the case of a consistent demodulation of sub-carriers, the distortion given by the channel is then corrected by estimating its value at every point of the time/frequency network.

The introduction of a guard interval of this kind thus reduces the phenomena related to inter-symbol interference.

However, one major drawback of this technique is that its spectral efficiency is limited since no payload information is transmitted during the guard interval.

On the other hand, OFDM/OQAM and BFDM/OQAM type modulation techniques do not necessitate the introduction of a guard interval or a cyclic prefix, while at the same time having the same spectral efficiency as classic OFDM modulation.

2.2 Estimation of the Transmission Channel

The distinct features of real type multicarrier modulations on the one hand and complex type multicarrier modulations on the other hand give rise to different types of processing when an estimation of the transmission channel is performed.

Here below, a detailed description is given of a technique for estimating the transmission channel for real type modulations, for example OFDM/OQAM or BFDM/OQAM type modulations. Indeed, in the case of a real type of multicarrier modulation, the fact of having an orthogonality of the translated values in the real sense makes the channel estimation process more difficult.

Indeed, to estimate the complex gain of the channel on a given sub-carrier, it would be appropriate to carry out the complex projection of the received signal on the sub-carrier considered. Now, the orthogonality of the translated values in the real sense and the fact that the prototype functions, even those chosen to be localized to the utmost extent in time and in frequency, have an infinite support on at least one of the two axes namely the time axis or the frequency axis, implying that even on an ideal channel, (intrinsic) inter-carrier interference will be generated.

Indeed, the imaginary part of the projection of the signal received on the base of the translated values of the prototype function is not 0. A disturbance-causing term then appears and gets added to the demodulated signal, and has to be corrected before the channel estimation is done. It is therefore necessary to design methods to compensate for this loss of complex orthogonality and thus mitigate at least some of the drawbacks of this prior-art technique for OFDM/OQAM or BFDM/OQAM type modulations.

Let us consider for example y(t) the signal received.

It is assumed especially that the choice of the parameters of the multicarrier modulation ensures that the channel may be considered to be flat on each of the sub-carriers for each OFDM/OQAM symbol. The channel can then be modeled by one complex coefficient per sub-carrier denoted $H_{m,n}$, where m is the index of the sub-carrier and n is the index of the OFDM/OQAM symbol.

We then use the complex projection of the multicarrier signal at the point $(m_0,n_0)$ of the time/frequency space to estimate the transmission channel $\hat{H}_{m_0,n_0}$ at this location.

Thus, if we send $a_{m_0,n_0} = \sqrt{E}$ at this location, we have:

$$\hat{H}_{m_0,n_0} = \frac{\int y(t) g^*_{m_0,n_0}(t) dt}{\sqrt{E}} \quad (4)$$

Assuming that the channel is ideal (y(t)=s(t)), given that the OFDM/OQAM and BFDM/OQAM modulations have only real orthogonality (equation (3)), we cannot have $\hat{H}_{m_0,n_0} = 1$.

Therefore, taking $a_{m_0,n_0}^{(c)} = \langle s, g_{m_0,n_0} \rangle_C = \int s(t) g^*_{m_0,n_0}(t) dt$, and assuming that the channel is ideal, we have:

$$a_{m_0,n_0}^{(c)} = \sqrt{E} + \underbrace{\sum_{(m,n) \neq (m_0,n_0)} a_{m,n} \int g_{m,n}(t) g^*_{m_0,n_0}(t) dt}_{I_{m_0,n_0} \in j\mathfrak{R}} \quad (5)$$

where $\langle,\rangle_C$ designates the complex scalar product.

The equation (5) expresses the fact that the complex projection of the perfectly transmitted signal is nevertheless affected by an inter-symbol interference (ISI) intrinsic to the OFDM/OQAM and BFDM/OQAM modulations denoted as $I_{m_0,n_0}$.

In particular, the existence of this inter-symbol interference greatly disturbs the estimation of the transmission channel and therefore the estimation of the symbols.

One solution to this problem has been proposed especially in the patent document WO 02/25884 published on 28 Mar. 2002.

More specifically, the technique proposed in this document enables this interference to be limited by using a specific framing of the data at transmission. Thus, with 3×3 zones of the time/frequency network, called a first ring, or zones of greater size, this technique associates a reference data element called a pilot as well as a piece of control data.

One drawback of this prior-art technique is that it calls for a matrix computation at transmission and at reception, with a matrix size that increases with the size of the ring.

Another drawback of this prior-art technique can be seen in the case of a transmission for which the time/frequency resource is distributed among several users. In this case, the ring relationship requires that all the data elements of a same ring should be assigned to the same user. This constraint poses especially problems of granularity and of the allocation of resources, the number of pilots sent being generally situated between 2% and 5%.

Another existing technique used to reduce the inter-symbol interference term consists in sending a preamble inserted in the multicarrier signal as a frame starter, one frame being formed by a set of at least one reference symbol called a preamble and a set of payload symbols. In this case, the preamble has a minimum duration of 3 $\tau_0$.

One drawback of this prior-art technique is the loss of spectral efficiency related to the sending of the preamble.

There is therefore a need for a technique providing for a better estimation of the transmission channel and giving a more precise estimation of the informative data elements carried by the multicarrier signal.

SUMMARY

An aspect of the disclosure relates to a method for receiving a received signal corresponding to a multicarrier signal implementing an OQAM type modulation, sent by at least one sender device through a transmission channel, said multicarrier signal being formed by a temporal succession of symbols formed by a set of data elements comprising:
  real-value informative data elements, and
  for at least certain of said symbols, reference data elements, called pilots, known to at least one receiver designed to make a reception of said multicarrier signal,
each of said data elements modulating a carrier frequency of said signal, a carrier frequency modulated by one of said data elements being called a carrier.

According to an embodiment of the invention, groups of at least two pilots, each located in a region known as a neighborhood region in the time/frequency space, a neighborhood region being a region in which said transmission channel is considered to be roughly constant, at least one of said groups comprising at least one real-value pilot and at least one pure-imaginary-value pilot, said reception method comprises, for at least one of said neighborhood regions:
  a step for extracting at least two complex values corresponding to the pilots of the group of said neighborhood region, after passage through said transmission channel,
  a step for estimating the real and imaginary parts of said transmission channel in said neighborhood region from said complex values.

Thus, an embodiment of the invention relies on a novel and inventive approach to the estimation of the transmission channel in a transmission system implementing a multicarrier signal bearing real-value data elements. In particular, a multicarrier signal of this kind is of the OFDM/OQAM or BFDM/OQAM type.

The term "OQAM type modulation" is understood to mean especially an OFDM/OQAM or BFDM/OQAM type multi-carrier modulation It may be recalled that the transmission channel is subdivided into cells along the time and frequency axes. Each cell or position of the time/frequency space is assigned a dedicated carrier. The information to be conveyed is thus distributed over all these carriers.

More specifically, the technique according to an embodiment of the invention relies on the implementation, on the reception side, of an estimation of the transmission channel in a neighborhood region in which a group of at least two pilots is located.

In particular, a neighborhood region is a region in which the transmission channel does not vary or varies little in time and/or in frequency.

Thus, this technique enables an estimation of the transmission channel for the neighborhood region without wasting the time/frequency resource since it is not necessary to impose a constraint on the value of a data element borne by a carrier that is a direct neighbor (i.e. situated in a region called the first ring) of each of the pilots of the group. It is therefore not necessary to impose a first-ring relationship to reduce the ISI.

Indeed, as compared with prior-art techniques, the technique of an embodiment of the invention can be used to optimize the time/frequency resource since it necessitates neither the use of a guard interval during which no payload information is transmitted, nor any specific framing of the data being sent while at the same time preserving the same density of pilots.

These pilots may especially be boosted.

According to one particular feature of an embodiment of the invention, each of said groups consists of a pair of pilots.

According to one particular embodiment, this distribution of the pilots in pairs makes it possible especially during said estimation step to implement a resolution of a system of four equations with four unknown quantities for each of said pair of pilots.

Indeed, for each pilot of each pair, during this estimation step, an embodiment of the invention uses the complex values received at the time/frequency locations (positions) of said pilots as well as knowledge of the values, real or imaginary, of said pilots before transmission by the transmission channel.

According to another aspect of an embodiment of the invention, for a group comprising at least one real-value pilot and at least one pure-imaginary-value pilot, said system implements the following equations:

$$\begin{cases} y_{m_0,n_0}^{(r)} = H_{m_0,n_0}^{(r)} a_{m_0,n_0}^{(r)} - CH_{m_0,n_0}^{(r)} a_{m_0,n_0}^{(i)} \\ y_{m_0,n_0}^{(i)} = CH_{m_0,n_0}^{(r)} a_{m_0,n_0}^{(r)} + H_{m_0,n_0}^{(r)} a_{m_0,n_0}^{(i)} \\ y_{m_1,n_1}^{(r)} = -\text{sign}(a_{m_1,n_1}^{(i)})(|a_{m_1,n_1}^{(r)}| + |a_{m_1,n_1}^{(i)}|)CH_{m_1,n_1}^{(r)} \\ y_{m_1,n_1}^{(i)} = \text{sign}(a_{m_1,n_1}^{(i)})(|a_{m_1,n_1}^{(r)}| + |a_{m_1,n_1}^{(i)}|)H_{m_1,n_1}^{(r)} \end{cases}$$

with:
- $(m_0,n_0)$ a first location of the time/frequency space and $(m_1,n_1)$ a second location of the time/frequency space in the neighborhood region,
- $y_{m_0,n_0}^{(r)}$ and $y_{m_0,n_0}^{(i)}$ real values respectively equal to the real part and to the imaginary part of the complex value of the signal received at $(m_0,n_0)$,
- $y_{m_1,n_1}^{(r)}$ and $y_{m_1,n_1}^{(i)}$ real values equal respectively to the real part and to the imaginary part of the complex value of the carrier situated at the location $(m_1,n_1)$,
- $H_{m_0,n_0}^{(r)}$ the real part of the complex value of said transmission channel at the location $(m_0,n_0)$ and $H_{m_1,n_1}^{(r)}$ the real part of the complex value of said transmission channel at the location $(m_1,n_1)$ with $H_{m_1,n_1}^{(r)}$ equal to $H_{m_0,n_0}^{(r)}$, the transmission channel being considered to be roughly constant in said neighborhood region,
- $a_{m_0,n_0}^{(r)}$ and $a_{m_0,n_0}^{(i)}$ being real values equal respectively to the real part and to the imaginary part of the complex value of said real-value pilot of the group of said neighborhood region at the position $(m_0,n_0)$,
- $a_{m_1,n_0}^{(i)}$ the imaginary part of the interference induced by said information elements neighboring said pure-imaginary-value pilot of the group of said neighborhood region at the position $(m_1,n_1)$,
- $ja_{m_1,n_1}^{(r)}$ the imaginary value received of said pure-imaginary-value pilot of the group of said neighborhood region at the position $(m_1,n_1)$,
- C a real number.

The term information elements "neighboring" said pilot is understood to mean the data elements closest to the pilot.

In particular, said estimation step implements an intermediate computation of a ratio between said real and imaginary parts of said complex values.

Should the pair of pilots include a real-value pilot and a pure-imaginary-value pilot, the method of reception according to an embodiment of the invention comprises a step for eliminating an intrinsic interference induced by said pure-imaginary-value pilot.

Another embodiment of the invention pertains to a device for receiving a received signal corresponding to a multicarrier signal implementing an OQAM type modulation as described here above, sent out by at least one sender through a transmission channel.

According to an embodiment of the invention, groups of at least two pilots being each located in a region known as a neighborhood region in the time/frequency space, a neighborhood region being a region in which said transmission channel is considered to be roughly constant, at least one of said groups comprising at least one real-value pilot and at least one pure-imaginary-value pilot, a reception device of this kind comprises, for at least one of said neighborhood regions:
- means for extracting at least two complex values corresponding to the pilots of the group of said neighborhood region, after passage though said transmission channel,
- means for estimating said real and imaginary parts of said transmission channel in said neighborhood region from said complex values.

A reception device of this kind is adapted especially to implementing the method of reception as described here above.

For example, a reception device of this kind corresponds to or is included in a terminal (radio telephone, laptop, PDA etc) or in a base station.

Another aspect of an embodiment of the invention pertains to a method for sending a multicarrier signal implementing an OQAM type modulation, intended for transmission via a transmission channel, formed by a temporal succession of symbols formed by a set of data elements comprising:
- real-value informative data elements, and
- for at least certain symbols among said symbols, reference data elements, called pilots, known to at least one receiver designed to perform a reception of said multicarrier signal, each of said data elements modulating a carrier frequency of said signal, a carrier frequency modulated by one of said data elements being called a carrier.

According to an embodiment of the invention, said method uses groups of at least two pilots, each located in a region known as a neighborhood region in the time/frequency space, a neighborhood region being a region in which said transmission channel is considered to be roughly constant, at least one of said groups comprising at least one real-value pilot and at least one pure-imaginary-value pilot.

More specifically, this technique relies on the implementation, on the sending side, of groups of at least two pilots, that is groups of at least two reference data elements, located in a neighborhood region, in which informative data elements can also be sent and in which informative data elements can also be sent and in which the transmission channel is considered to be appreciably constant.

On the reception side, it is thus possible to make an estimation of the transmission channel in the neighborhood region.

According to a particular aspect of an embodiment of the invention, each of said groups is constituted by a pair of pilots.

In particular, the pilots constituting a pair may be distributed in time and/or in frequency.

Thus, if the transmission channel is substantially constant in time, the pilots of the pair may be spread in time and, if the transmission channel is roughly constant in frequency, the pilots of the pair may be spread in frequency. If the transmission channel is substantially constant in time and in frequency, the pilots may also be spread in time and in frequency.

According to a particular aspect of an embodiment of the invention, in a system in which at least certain of said carriers bear at least two data elements intended respectively for distinct users and/or services, a sending method of this kind uses a same carrier modulated by at least two pilots each associated with one of said users and/or services.

For example such a system enables the use of certain carriers to carry data elements intended for distinct users by means of a spread code associated with each user.

Thus, according to this particular aspect of an embodiment of the invention, a same carrier can be modulated by at least two pilots each associated with a distinct user.

Similarly, such a system enables the use of certain carriers to carry data elements intended for distinct services or users by means of a spread code associated with each service.

Thus, according to another particular aspect of an embodiment of the invention, a same carrier can be modulated by at least two pilots each associated with a distinct service.

According to another aspect of an embodiment of the invention, at least one of said pairs is formed by a real-value pilot and a pure-imaginary-value pilot.

Thus the sending method of an embodiment of the invention comprises a step to determine the nature of said pilots, said nature belonging to the group comprising the real nature and the pure imaginary nature.

Should at least one of the pairs of pilots be constituted by a real-value pilot and a pure-imaginary-value pilot, the sending method of an embodiment of the invention comprises a step to determine the sign of said imaginary-value pilot.

According to a particular aspect of an embodiment of the invention, at least one of said steps to determine the nature of said pilots and the sign of said imaginary pilot depends on the value of at least one of the informative data elements neighboring each of said pilots.

More particularly, the sign of said pure-imaginary-value pilot is the same as the sign of the value of an interference term induced by said informative data elements neighboring said pilot on said pilot.

Another embodiment of the invention also concerns a device for sending a multicarrier signal implementing an OQAM type modulation as described here above.

According to an embodiment of the invention, a sending device of this kind comprises means for implementing groups of at least two pilots, each located in a region known as a neighborhood region in the time/frequency space, a neighborhood region being a region in which said transmission channel is considered to be substantially constant, at least one of said groups comprising at least one real-value pilot and at least one pure-imaginary-value pilot.

Such a sending device is adapted especially to implementing the sending method as described here above.

In particular, it is adapted to sending a multicarrier signal of this kind indented for the reception device described here above.

For example, a sending device of this kind corresponds to or is included in a terminal (radio telephone, laptop, PDA etc) or in a base station.

Yet another aspect of an embodiment of the invention concerns a computer program product downloadable from a communications network and/or stored on a computer-readable carrier and/or executable by a processor comprising program code instructions for the implementation of the method for receiving as described here above and a computer program product downloadable from a communications network and/or stored on a computer-readable carrier and/or executable by a processor comprising program code instructions for the implementation of the sending method as described here above.

Finally, another aspect of an embodiment of the invention concerns a multicarrier signal implementing an OQAM type modulation, formed by a temporal succession of symbols formed by a set of data elements comprising:

real-value informative data elements, and for at least certain of said symbols, reference data elements, called pilots, known to at least one receiver designed to carry out a reception of said multicarrier signal, each of said data elements modulating a carrier frequency of said signal, a carrier frequency modulated by one of said data elements being called a carrier.

According to an embodiment of the invention, said set of data elements comprises groups of at least two pilots, each located in a region known as a neighborhood region in the time/frequency space, a neighborhood region being a region in which said transmission channel is considered to be substantially constant, at least one of said groups comprising at least one real-value pilot and at least one pure-imaginary-value pilot.

According to a particular aspect of an embodiment of the invention, at least one of said groups is constituted by a pair comprising one real-value pilot and one pure-imaginary-value pilot.

A signal such as this may especially represent a multicarrier signal sent according to the method for sending described here above.

It may also be received according to the method for receiving described here above.

BRIEF DESCRIPTION OF THE DRAWINGS

Other features and advantages shall appear more clearly from the following description of a preferred embodiment, given by way of a simple non-exhaustive and illustrative example, and from the appended drawings, of which.

DETAILED DESCRIPTION OF ILLUSTRATIVE EMBODIMENTS

1. Description of One Embodiment of the Invention

The general principle of an embodiment of the invention relies on the taking into account of at least one group of pilots in a multicarrier signal implementing real-value informative data elements so as to obtain an estimation of the transmission channel between a sender and a receiver, at reception.

More specifically, the invention, in one particular embodiment, relies on the fact that each group of pilots is located in a region known as a neighborhood region in which the transmission channel is deemed to be appreciably constant.

Thus, the estimation of the transmission channel in this embodiment is obtained for said neighborhood region.

A description is provided here below of a particular embodiment of the invention implemented in the context of an OFDM/OQAM type multicarrier modulation.

On the sending side, one or more groups of pilots are inserted into the multicarrier signal, at least one of the groups comprising at least one real-value pilot and at least one pure-imaginary-value pilot, i.e. reference data elements, known to the receiver, located in a neighborhood region in which the transmission channel is considered to be invariant.

In particular, a group of pilots according to this embodiment of the invention is constituted by a pair of pilots distributed in time and/or in frequency depending on whether the channel is considered to be appreciably constant in time and/or in frequency.

This embodiment is of course not exhaustive, for the groups of pilots could include more than two pilots (for example three or four pilots). Furthermore, if several groups of pilots are considered, these groups may have distinct cardinality (i.e. a different number of pilots in each group).

More specifically, as illustrated with reference to FIG. 2A, we consider a multicarrier signal formed by a temporal succession of symbols $21_1, 21_2, \ldots, 21_N$ constituted by a set of data elements comprising:

real-value informative data elements corresponding to the blank white circles; and for at least some of said symbols, reference data elements called pilots corresponding to the blank circles annotated with the letter P known to at least one receiver intended for the performance of a reception of the multicarrier signal.

More specifically, the pilots are inserted in pairs into the multicarrier signal so as to enable an estimation of the transmission channel at reception for the region in which said pilots are inserted in sending mode.

Figure 1:
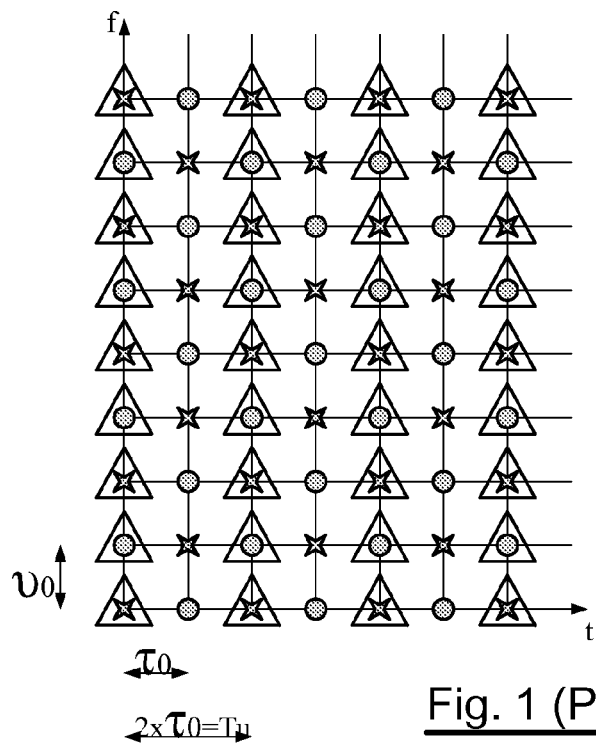
FIG. 1, already commented upon with reference to the prior art, is a time/frequency representation of the complex-value symbols transmitted according to a classic OFDM modulation and real-value symbols transmitted according to a prior art OFDM/OQAM modulation.
Figure 2A:
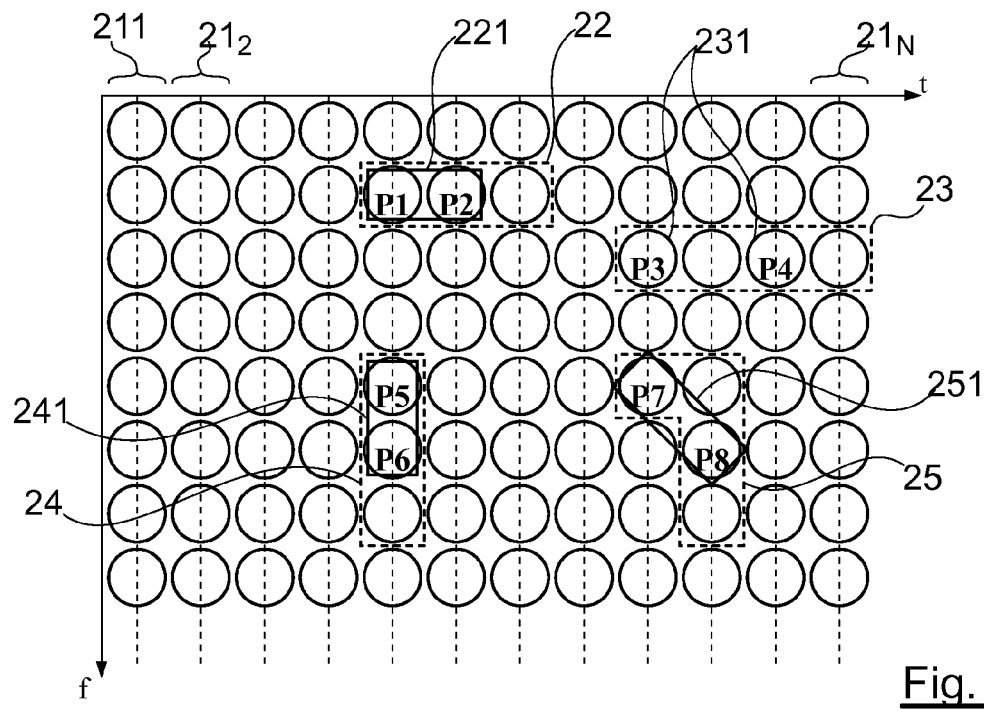
FIG. 2A illustrates the structure of a multicarrier signal according to one embodiment of the invention.

For example, if the channel is deemed to be appreciably constant in time in a neighborhood region 22, demarcated by dotted lines, the pilots P1 and P2 of the pair 221, demarcated in a solid line in FIG. 2A, are added to the multicarrier signal on two real, temporally consecutive symbols of the region 22.

Depending on the temporal variations of the transmission channel, the pilots may be inserted on two non-consecutive symbols such as for example the pilots P3 and P4 of the pair 231, a neighborhood region 23 considered for the estimation of the channel being demarcated by dotted lines.

According to one alternative embodiment in which the transmission channel does not vary in frequency or varies little in frequency, the pilots P5 and P6 of the pair 241 (demarcated by solid lines in FIG. 2A) are added to the multicarrier signal on two consecutive frequencies of a neighborhood region 24 (demarcated by dotted lines).

Similarly, depending on the frequency variations of the transmission channel, the pilots may be inserted on two non-consecutive frequencies.

According to another alternative embodiment of the invention, the pilots P7 and P8 of the pair 251 are added to the multicarrier signal on two consecutive symbols and on two consecutive frequencies. In this case the channel is considered to be appreciably constant in time and in frequency, in a neighborhood region 25 (demarcated by dotted lines) considered for the estimation of the channel.

For example, the pilot P7 of the pair 251 has a real value and the pilot P8 of the pair 251 has a pure imaginary value.

Figure 2B:
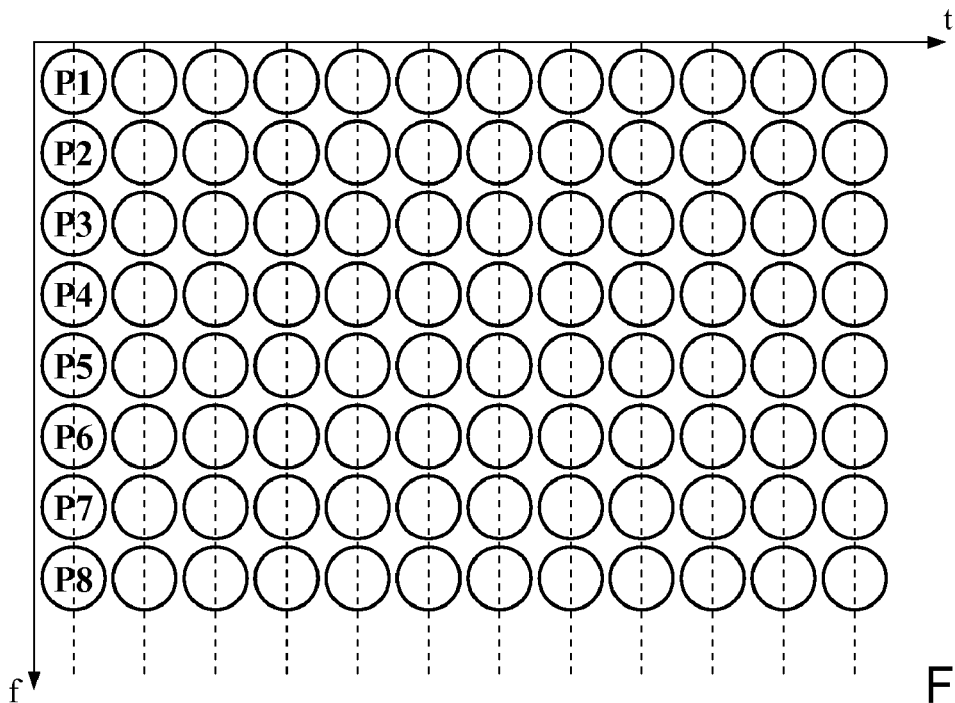
FIGS. 2B and 2C illustrate examples of a particular distribution of the pairs of pilots according to embodiments of the invention.
Figure 2C:
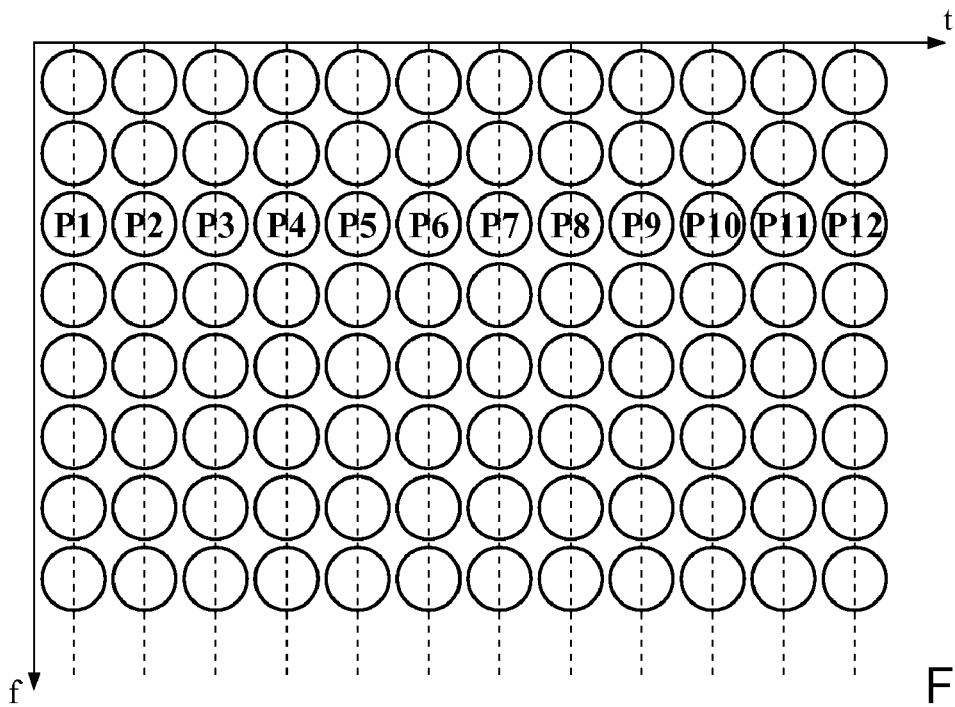

Two examples of alternative embodiments are illustrated in FIGS. 2B and 2C.

In FIG. 2B, the pairs of pilots, each having a real or pure imaginary value are inserted into the same symbol so as to form a preamble. The pairs of pilots (P2m−1/P2m) are used to estimate the channel at the time t. It may be recalled that at least one of the pairs comprises a pilot with real value and a pilot with pure imaginary value.

In FIG. 2C, the pairs of pilots, each having a real value or a pure imaginary value, are inserted into a dedicated carrier on symbols consecutive in time. The pairs of pilots (P2m−1, P2m) enable an estimation of the channel at the frequency m. Again, at least one of the pairs comprises a real-value pilot and a pure-imaginary-value pilot.

In these two alternative embodiments, the estimation of the channel can also be done from groups of three pilots or more, thus enabling a better estimation according to the channel.

Figure 3:
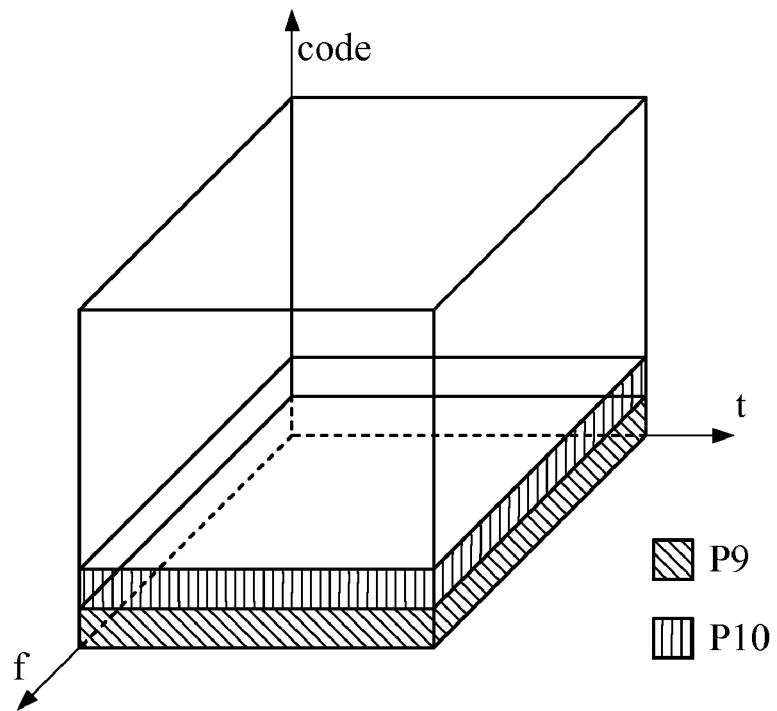
FIG. 3 illustrates an example of a positioning of the pilots of a multicarrier signal according to one embodiment of the invention.

According to one alternative embodiment illustrated in FIG. 3, certain carriers of the multicarrier signal bear at least two data elements intended respectively for distinct users and/or distinct services. The sending method of the invention, in this alternative embodiment, inserts two pilots P9 and P10 into the same carrier, shown in this figure as a time/frequency block in which the channel is assumed to be appreciably constant, these two pilots P9 and P10 being transmitted at the same time as the data and being intended for two distinct users and/or two distinct services. The axis called the "code" axis enables the association with each data element (informative or reference data element) of a code, known to the receiver and being used to distinguish the users and/or services.

Figure 4:
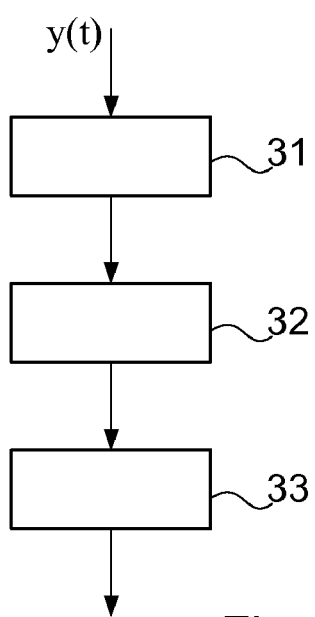
FIG. 4 presents the main steps of the reception method according to one embodiment of the invention.

On the reception side, as illustrated with reference to FIG. 4, the complex values corresponding to the pilots of a group in a neighborhood region are extracted 31 from the received signal y(t). By way of an example, a group comprising a pair of pilots is considered.

Form these complex values, a system of four equations with four unknown quantities is obtained for each pair of pilots.

First of all, an intermediate computation 32 is performed of the ratio between the real and imaginary parts of the channel, in taking account of the real and/or imaginary values of the two pilots of the pair and of complex values received at their positions and extracted at the step 31.

Then, the system of equations is resolved at the step 33 to obtain the estimation of the transmission channel for the neighborhood region of the pair of pilots considered.

Here below, a first example is described of an implementation of the reception technique according to a first variant of this particular embodiment of the invention, in the context of a BFDM/OQAM type modulation.

More specifically, the received signal y(t) can be written in the form:

$$y(t) = \sum_{n} \sum_{m=0}^{M-1} H_{m,n}^{(c)} a_{m,n} g_{m,n}(t) + b(t), \quad (6)$$

with $H_{m,n}^{(c)}$ being the complex coefficients representing the transmission channel at each time/frequency location with m the frequency index and n the time index and b(t) the noise component.

As already specified for the OFDM/OQAM type modulations, the sent signal and the transmission channel being modeled in baseband by complex numbers, the coefficient $a_{m_0,n_0}^{(c)}$ to be estimated at reception for each element $(m_0,n_0)$ of the time/frequency network is also a complex number.

Also assuming that the channel is approximately constant on a given region of the time/frequency space, owing to the biorthogonality of the pair of functions (f,g) described with reference to the equation (3), the signal received on the carrier $m_0$ at the instant $n_0$ is estimated by:

$$y_{m_0,n_0}^{(c)} = \langle s, f_{m_0,n_0} \rangle_C \quad (7)$$

$$y_{m_0,n_0}^{(c)} = H_{m_0,n_0}^{(c)} a_{m_0,n_0} + H_{m_0,n_0}^{(c)} \underbrace{\left[ \sum_{(m,n) \neq (m_0,n_0)} a_{m,n} \int g_{m,n}(t) f_{m_0,n_0}^*(t) dt \right]}_{C_{m_0,n_0}} + D_{m_0,n_0} + b_{m_0,n_0}$$

In this expression the term $C_{m_0,n_0}$ is linked to the interference created in the region where the transmission channel is assumed to be constant and the term $D_{m_0,n_0}$ associated with the interference created in the regions where the transmission channel is no longer supposed to be constant.

Here below in the description, the noise component b is omitted and the term $D_{m_0,n_0}$ is overlooked so as to simplify the equations.

It is assumed here that the channel is appreciably constant in time and/or in frequency, i.e. on $(\delta n+1)\tau_0$ and/or $(\delta m+1)v_0$, with $\delta n$ and $\delta m$ being integers.

The equation (7) is then written as follows:

$$y_{m_0,n_0}^{(c)} = H_{m_0,n_0}^{(c)} a_{m_0,n_0} + H_{m_0,n_0}^{(c)} C_{m_0,n_0} = H_{m_0,n_0}^{(c)} (a_{m_0,n_0} + C_{m_0,n_0}),$$

with $a_{m_0,n_0}$ being a real number and $C_{m_0,n_0}$ being a pure imaginary value.

We thus consider that the received signal, at any location (m,n) of the time/frequency network can be interpreted as the result of the product of a complex channel by a complex coefficient, i.e.:

$$y_{m,n}^{(c)} = H_{m,n}^{(c)} a_{m,n}^{(c)} = H_{m,n}^{(c)} (a_{m,n}^{(r)} + j a_{m,n}^{(i)}) = H_{m,n}^{(c)} (a_{m,n}^{(r)} + C_{m,n}),$$

where $a_{m,n}^{(r)}$ and $a_{m,n}^{(i)}$ are real values (the exponent (r) indicating the real part of a complex value and the exponent (i) the imaginary part).

Here, we consider a particular variant of the embodiment in which the channel is appreciably constant in time on a duration $2\tau_0$. In this example, the pilots $a_{m_0,n_0}$ and $a_{m_0,n_0+1}$ are inserted in the signal at the locations $(m_0,n_0)$ and $(m_0,n_0+1)$, and form a pair used to estimate the channel in a neighborhood region where the channel is considered to be appreciably constant in time.

The real and imaginary parts of the received signal $y_{m,n}^{(c)}$ are written as follows in assuming $H_{m,n}^{(c)} = H_{m,n}^{(r)} + jH_{m,n}^{(i)}$:

$$\begin{cases} y_{m,n}^{(r)} = H_{m,n}^{(r)} a_{m,n}^{(r)} - H_{m,n}^{(i)} a_{m,n}^{(i)} \\ y_{m,n}^{(i)} = H_{m,n}^{(i)} a_{m,n}^{(r)} + H_{m,n}^{(r)} a_{m,n}^{(i)} \end{cases} \quad (8)$$

Since the channel is assumed to be constant on $2\tau_0$, we have $H_{m_0,n_0}^{(c)} = H_{m_0,n_0+1}^{(c)}$. In assuming $H_{m_0,n_0}^{(i)} = CH_{m_0,n_0}^{(r)}$, C being a real value, the following system of four equations with four unknown quantities is obtained:

$$\begin{cases} y_{m_0,n_0}^{(r)} = H_{m_0,n_0}^{(r)} a_{m_0,n_0}^{(r)} - CH_{m_0,n_0}^{(r)} a_{m_0,n_0}^{(i)} \\ y_{m_0,n_0}^{(i)} = CH_{m_0,n_0}^{(r)} a_{m_0,n_0}^{(r)} + H_{m_0,n_0}^{(r)} a_{m_0,n_0}^{(i)} \\ y_{m_0,n_0+1}^{(r)} = H_{m_0,n_0}^{(r)} a_{m_0,n_0+1}^{(r)} - CH_{m_0,n_0}^{(r)} a_{m_0,n_0+1}^{(i)} \\ y_{m_0,n_0+1}^{(i)} = CH_{m_0,n_0}^{(r)} a_{m_0,n_0+1}^{(r)} + H_{m_0,n_0}^{(r)} a_{m_0,n_0+1}^{(i)} \end{cases} \quad (9)$$

from which we can deduce:

$$\begin{cases} a_{m_0,n_0+1}^{(r)} y_{m_0,n_0}^{(r)} - a_{m_0,n_0}^{(r)} y_{m_0,n_0+1}^{(r)} = CH_{m_0,n_0}^{(r)} \left( -a_{m_0,n_0+1}^{(r)} a_{m_0,n_0}^{(i)} + a_{m_0,n_0}^{(r)} a_{m_0,n_0+1}^{(i)} \right) \\ a_{m_0,n_0+1}^{(r)} y_{m_0,n_0}^{(i)} - a_{m_0,n_0}^{(r)} y_{m_0,n_0+1}^{(i)} = H_{m_0,n_0}^{(r)} \left( a_{m_0,n_0+1}^{(r)} a_{m_0,n_0}^{(i)} - a_{m_0,n_0}^{(r)} a_{m_0,n_0+1}^{(i)} \right) \end{cases}$$

In taking the ratio of the two equations:

$$C = \frac{a_{m_0,n_0+1}^{(r)} y_{m_0,n_0}^{(r)} - a_{m_0,n_0}^{(r)} y_{m_0,n_0+1}^{(r)}}{a_{m_0,n_0}^{(r)} y_{m_0,n_0+1}^{(i)} - a_{m_0,n_0+1}^{(r)} y_{m_0,n_0}^{(i)}} \quad (10)$$

and in assuming that the equation (8) can be written as follows:

$$\begin{cases} y_{m,n}^{(r)} = H_{m,n}^{(r)} a_{m,n}^{(r)} - CH_{m,n}^{(r)} a_{m,n}^{(i)} \\ y_{m,n}^{(i)} = CH_{m,n}^{(r)} a_{m,n}^{(r)} + H_{m,n}^{(r)} a_{m,n}^{(i)} \end{cases}$$

we obtain:

$$\begin{cases} y_{m_0,n_0}^{(r)} = H_{m_0,n_0}^{(r)} a_{m_0,n_0}^{(r)} - CH_{m_0,n_0}^{(r)} a_{m_0,n_0}^{(i)} \\ Cy_{m_0,n_0}^{(i)} = C^2 H_{m_0,n_0}^{(r)} a_{m_0,n_0}^{(r)} + CH_{m_0,n_0}^{(r)} a_{m_0,n_0}^{(i)} \end{cases}$$

In taking the sum of these two equations, we get:

$$H_{m_0,n_0}^{(r)} a_{m_0,n_0}^{(r)}(1+C^2) = y_{m_0,n_0}^{(r)} + Cy_{m_0,n_0}^{(i)} \text{ whence:}$$

$$H_{m_0,n_0}^{(r)} = \frac{y_{m_0,n_0}^{(r)} + Cy_{m_0,n_0}^{(i)}}{a_{m_0,n_0}^{(r)}(1+C^2)} \text{ et } H_{m_0,n_0}^{(i)} = CH_{m_0,n_0}^{(r)}$$

Thus, we obtain the estimation of the channel in a neighborhood region where the channel is deemed to be appreciably constant and wherein a pair of pilots has been inserted according to the embodiment described here above.

More generally, the two real pilots can be inserted into the signal at any position $(m_1,n_1)$ and $(m_2,n_2)$ whatsoever with $(m_2=m_1+\delta m, n_2=n_1+\delta n)$, the only constraint being that the channel remains practically invariant on a number of frequencies corresponding to $\delta m+1$ and on a number of real symbols equivalent to $\delta n+1$.

The resolution method as described here above applies to this general case.

Here below, a second example is described of an implementation of the reception technique according to a second variant of this particular embodiment of the invention in the context of a BFDM/OQAM type modulation.

In this example, the pair of pilots used to estimate the channel in a neighborhood region in which the channel is deemed to appreciably constant in time comprises a first pilot $a_{m_0,n_0}j$ with a pure imaginary value at the position $(m_0,n_0)$ and a second pilot $a_{m_0,n_0+1}$ with a real value at the position $(m_0, n_0+1)$.

The real value $a_{m_0,n_0+1}$ of the second pilot is known to the receiver, and the value $a_{m_0,n_0}j$ of the first pilot is also known, barring the sign, to the receiver. Indeed, the sign of the value of the pilot with pure imaginary value, called the first pilot, depends on the information data elements with real values transmitted around this first pilot.

A method is described here below to determine the sign of the value of the first pilot $a_{m_0,n_0}j$, in computing the imaginary interference about the position $(m_0,n_0)$ of the first pilot from the following relationship:

$$a_{m_0,n_0}^{(i)} \approx \sum_{p,q \in \Omega_{P,Q}} \Im\{\beta_{m_0+p,n_0+q}^{(m_0,n_0)}\}\alpha_{m_0+p,n_0+q}^{(r)} \approx$$

$$\sum_{p,q \in \Omega_{P,Q}} \Im\{\beta_{m_0+p,n_0+q}^{(m_0,n_0)}\}\hat{\alpha}_{m_0+p,n_0+q}^{(r)}$$

where $\Omega_{P,Q}$ corresponds to the neighborhood of the time/frequency plane about the point $(m_0,n_0)$, diverging at the most by ±P positions in time and by ±Q in frequency, to the exclusion of the central element, and where $\beta_{p,q}$ is an expression whose real values depend on the functions g and f and of the phase term $\phi_{m,n}$, and whose main elements are presented in Appendix A which is an integral part of the present description.

Here below, P and Q shall be deemed to be equal to 1, and the sign of the imaginary pilot is determined as follows:

if $a_{m_0,n_0}^{(i)} < 0$, then a pilot with pure imaginary value having a negative sign is transmitted at the position $(m_0,n_0)$, whose modulus is known to the receiver (for example −1), if $a_{m_0,n_0}^{(i)} > 0$, then a pilot with pure imaginary value having a positive sign at the position $(m_0,n_0)$ is transmitted, the modulus of which is known to the receiver (for example +1)

Once the sign and the value have been chosen for the pilot $a_{m_0,n_0}$ with pure imaginary value, the value of the pilot with real value transmitted at the position $(m_0,n_0+1)$ is determined.

In general, it is enough to have: $|a_{m_0,n_0+1}^{(r)}| > |\beta_{m_0,n_0}^{(m_0,n_0+1)} a_{m_0,n_0}^{(r)}|$.

Preferably, $a_{m_0,n_0+1}$ and $a_{m_0,n_0}$ are chosen to be equal in modulus.

The description now focuses on the signal received at any location of the time/frequency network which may be interpreted as the result of the product of a complex channel multiplied by a complex coefficient, i.e.:
$y_{m,n}^{(c)} = H_{m,n}^{(c)} a_{m,n}^{(c)} = H_{m,n}^{(c)}(a_{m,n}^{(r)} + ja_{m,n}^{(i)})$, where $a_{m,n}^{(r)}$ and $a_{m,n}^{(i)}$ are real values (the exponent (r) indicating the real part of a complex value and the exponent (i) the imaginary part).

We consider the example in which a pilot $a_{m_0,n_0}$ with a pure imaginary value is transmitted at the position $(m_0,n_0)$ and a pilot $a_{m_0,n_0+1}$ with a real value at the position $(m_0,n_0+1)$ with:
$a_{m_0,n_0}j$ imaginary value having the same sign as $a_{m_0,n_0}^{(i)}$,
$a_{m_0,n_0+1}$ real value and known to the receiver.

We then have, at the positions $(m_0,n_0)$ and $(m_0,n_0+1)$, two pilots, a received signal being possibly written as follows:

$$y_{m_0,n_0}^{(c)} = H_{m_0,n_0}^{(c)}(a_{m_0,n_0}^{(r)}j + ja_{m_0,n_0}^{(i)})$$

and $$y_{m_0,n_0+1}^{(c)} = H_{m_0,n_0+1}^{(c)}(a_{m_0,n_0+1}^{(r)} + ja_{m_0,n_0+1}^{(i)}) - \beta_{m_0,n_0}^{(m_0,n_0+1)} H_{m_0,n_0}^{(c)} a_{m_0,n_0}^{(r)} j$$

Indeed, the fact of transmitting a pilot with pure imaginary value at the position $(m_0,n_0)$ induces an interference of a value $\beta_{m_0,n_0}^{(m_0,n_0+1)} a_{m_0,n_0}^{(r)} j$ (avec $|\beta_{m_0,n_0}^{(m_0,n_0+1)}| < 1$), which we shall call intrinsic here below in the description, in $(m_0,n_0+1)$.

It may be recalled that in this second variant of this particular embodiment of the invention, as in the first variant, the channel is also deemed to be substantially constant in time. It is therefore possible to write:

$$H_{m_0,n_0+1}^{(c)} = H_{m_0,n_0}^{(c)} = R * \exp(j\phi_0)$$

where R is the modulus of the channel (hence a positive real number) and $\phi_0$ is the phase of the channel.

The signal received at the positions of the two pilots can therefore be written as follows:

$$\begin{cases} y_{m_0,n_0}^{(c)} = H_{m_0,n_0}^{(c)} j\left(\alpha_{m_0,n_0}^{(r)} + \alpha_{m_0,n_0}^{(i)}\right) \\ y_{m_0,n_0+1}^{(c)} = H_{m_0,n_0}^{(c)}\left(\alpha_{m_0,n_0+1}^{(r)} + \beta_{m_0,n_0}^{(m_0,n_0+1)}\alpha_{m_0,n_0}^{(r)}j + j\alpha_{m_0,n_0+1}^{(i)}\right) \end{cases} \quad (11)$$

In $(m_0, n_0)$ (the position of the pilot with the pure imaginary value), the received signal is written as follows:

$$y_{m_0,n_0}^{(c)} = H_{m_0,n_0}^{(c)} j(a_{m_0,n_0}^{(r)} + a_{m_0,n_0}^{(i)}) \quad (12)$$

If we consider $\phi_1$ the phase of this received signal $y_{m_0,n_0}^{(c)}$ according to (12), we have:

$$-si\ a_{m_0,n_0}^{(i)} > 0 \phi_0 = \phi_1 - \frac{\pi}{2}$$

$$-si\ a_{m_0,n_0}^{(i)} < 0 \phi_0 = \phi_1 - \frac{\pi}{2} + \pi$$

This gives the signal received at the position $(m_0, n_0+1)$ (that of the pilot with the real value) the following equation:

$$\exp\left(-j\phi_1 + j\frac{\pi}{2}\right) y_{m_0,n_0+1}^{(c)} =$$
$$R\exp\left(j(\phi_0 - \phi_1 + \frac{\pi}{2})\right)\left(a_{m_0,n_0+1}^{(r)} + \beta_{m_0,n_0}^{(m_0,n_0+1)} a_{m_0,n_0}^{(r)} j + j a_{m_0,n_0+1}^{(i)}\right)$$

We shall now consider the two cases corresponding to the two signs of $a_{m_0,n_0}^{(i)}$:

a) if $a_{m_0,n_0}^{(i)} > 0$, we can write:

$$\exp\left(-j\phi_1 + j\frac{\pi}{2}\right) y_{m_0,n_0+1}^{(c)} = R\left(a_{m_0,n_0+1}^{(r)} + \beta_{m_0,n_0}^{(m_0,n_0+1)} a_{m_0,n_0}^{(r)} j + j a_{m_0,n_0+1}^{(i)}\right)$$

giving:

$$\Re\left(\exp\left(-j\phi_1 + j\frac{\pi}{2}\right) y_{m_0,n_0+1}^{(c)}\right) = R\left(a_{m_0,n_0+1}^{(r)} + \beta_{m_0,n_0}^{(m_0,n_0+1)} a_{m_0,n_0}^{(r)} j\right)$$

From this expression, we can deduce the following assertions, because it is known that $R(a_{m_0,n_0+1}^{(r)} + \beta_{m_0,n_0}^{(m_0,n_0+1)} a_{m_0,n_0}^{(r)} j)$ is of the sign of $a_{m_0,n_0+1}^{(r)}$:

$a_{m_0,n_0}^{(r)}$ is positive, its modulus is known to the receiver, hence its value is known to the receiver, the phase of the channel is:

$$\phi_1 - \frac{\pi}{2},$$

the modulus of the channel can be written as:

$$\frac{R\left(\exp\left(-j\phi_1 + j\frac{\pi}{2}\right) y_{m_0,n_0+1}^{(c)}\right)}{\left(a_{m_0,n_0+1}^{(r)} + \beta_{m_0,n_0}^{(m_0,n_0+1)} a_{m_0,n_0}^{(r)}\right) j}.$$

b) if $a_{m_0,n_0}^{(i)} < 0$, we can write:

$$\exp\left(-j\phi_1 + j\frac{\pi}{2}\right) y_{m_0,n_0+1}^{(c)} = -R\left(a_{m_0,n_0+1}^{(r)} + \beta_{m_0,n_0}^{(m_0,n_0+1)} a_{m_0,n_0}^{(r)} j + j a_{m_0,n_0+1}^{(i)}\right)$$

giving:

$$\Re\left(\exp\left(-j\phi_1 + j\frac{\pi}{2}\right) y_{m_0,n_0+1}^{(c)}\right) = -R\left(a_{m_0,n_0+1}^{(r)} + \beta_{m_0,n_0}^{(m_0,n_0+1)} a_{m_0,n_0}^{(r)} j\right)$$

Here too, from this expression, we can deduce the following assertions for it is known that $-R(a_{m_0,n_0+1}^{(r)} + \beta_{m_0,n_0}^{(m_0,n_0+1)} a_{m_0,n_0}^{(r)} j)$ has the opposite sign to $a_{m_0,n_0+1}^{(r)}$:

$a_{m_0,n_0}^{(r)}$ is negative, its modulus is known to the receiver, hence its value is known to the receiver.

the phase of the channel is:

$$\phi_1 - \frac{\pi}{2} + \pi,$$

the modulus of the channel can be written as:

$$\frac{-R\left(\exp\left(-j\phi_1 + j\frac{\pi}{2}\right) y_{m_0,n_0+1}^{(c)}\right)}{\left(a_{m_0,n_0+1}^{(r)} + \beta_{m_0,n_0}^{(m_0,n_0+1)} a_{m_0,n_0}^{(r)}\right) j}.$$

In both cases, we therefore obtain an estimation of the channel and knowledge of the value of $a_{m_0,n_0}^{(r)}$ makes it possible to eliminate interference around the position of the pilot with pure imaginary value.

In this second variant of this particular embodiment (the case with a pilot having a real value and a pilot having a pure imaginary value), it is also possible to repeat the same reasoning as in the first alternative embodiment (the case with the two real pilots) on the basis of the following system of equations:

$$\begin{cases} y_{m_0,n_0}^{(r)} = H_{m_0,n_0}^{(r)} a_{m_0,n_0}^{(r)} - CH_{m_0,n_0}^{(r)} a_{m_0,n_0}^{(i)} \\ y_{m_0,n_0}^{(i)} = CH_{m_0,n_0}^{(r)} a_{m_0,n_0}^{(r)} + H_{m_0,n_0}^{(r)} a_{m_0,n_0}^{(i)} \\ y_{m_1,n_1}^{(r)} = -\text{sign}(a_{m_1,n_1}^{(r)})(|a_{m_1,n_1}^{(i)}| + |a_{m_1,n_1}^{(i)}|) CH_{m_1,n_1}^{(r)} \\ y_{m_1,n_1}^{(i)} = \text{sign}(a_{m_1,n_1}^{(r)})(|a_{m_1,n_1}^{(i)}| + |a_{m_1,n_1}^{(i)}|) H_{m_1,n_1}^{(r)} \end{cases} \quad (13)$$

In the particular case illustrated in FIG. 3, already described here above, the method of resolution is the same with a pilot value received at a position $(m,n)$ that can be written as follows:

$$a_{m,n} = \sum_{u=0}^{N-1} a_{m,n,u} \text{ with } a_{m,n,u} = c_{u(m,n)} d_{m,n} \quad (14)$$

where $c_{u(m,n)}$ designates the spread code used to recognize the associated user and/or the service, and $d_{m,n}$ designates a pilot value.

Figure 5:
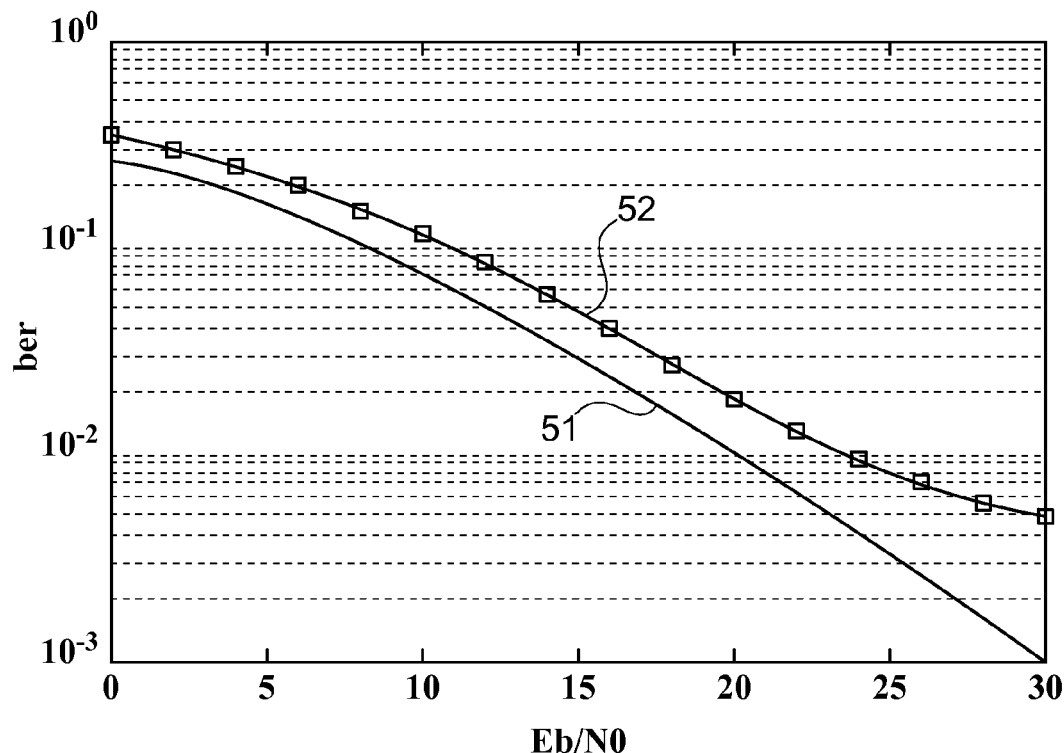
FIG. 5 illustrates the comparative result of a perfect channel estimation and of a channel estimation according to one particular embodiment of the invention.

Referring now to FIG. 5, we present a curve of performance in terms of binary error rate taking account of a perfect estimation of the transmission channel 51 and of an estimation channel 52 according to an exemplary embodiment of the invention.

The parameters taken into consideration to estimate a radio type channel, known as spatial Channel Mode, according to this example, are the following:

center frequency: 2000 MHz,
speed of motion of the mobile: 50 km/h,
number of paths: 6 power profile (in dB): −3.0, 0.0, −2.0, −6.0, −8.0, −10.0, profile of time lags (ns): 0, 195.315, 488.28125, 976.5625, 2246.09375, 4882.8125.

The prototype function used is the IOTA function as described for example in the French patent document FR 2733869, having a length 4 $\tau_0$, and each carrier is modulated by a phase modulation. The curve 52 represents the binary error rate in reception, in taking account of an estimation of the channel according to a particular embodiment of the invention in which it is assumed that the channel is substantially constant over two consecutive frequencies and in which the pairs of pilots are distributed throughout the frame. The other curve 51 represents the binary error rate in reception in taking account of perfect knowledge of the transmission channel when sending.

Figure 6A:
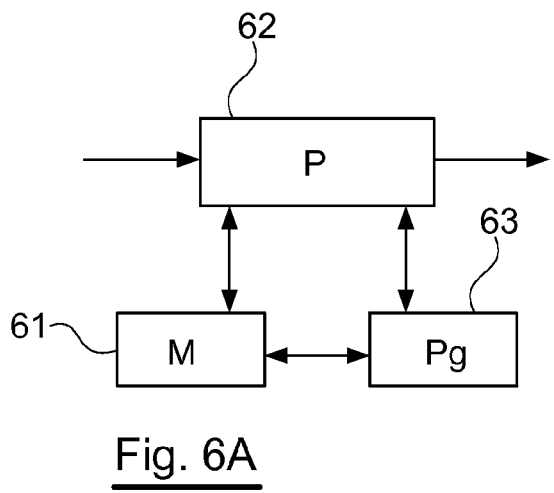
FIGS. 6A and 6B respectively present the structure of a sending device and a receiving device according to one particular embodiment of the invention.
Figure 6B:
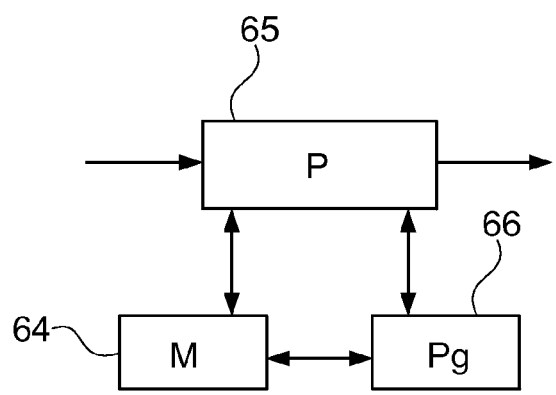

Referring now to FIGS. 6A and 6B, we present the simplified structures of a sending and receiving device according to the particular embodiment described here above.

As illustrated in FIG. 6A, a sending device of this kind comprises a memory 61, a processing unit 62 equipped for example with a microprocessor µP and driven by the computer program 63 implementing the sending method according to an embodiment of the invention.

At initialization, the code instructions of the computer program 63 are loaded for example into a RAM and then executed by the processor of the processing unit 62. At input, the processing unit 62 receives data to be transmitted in the form of informative data elements. The microprocessor of the processing unit 62 implements the steps of the sending method described here above so as to build a multicarrier signal comprising groups of at least two real-value pilots each located in a region known as a neighborhood region in the time/frequency space, a neighborhood region being a region in which said transmission channel is considered to be appreciably constant.

To this end, the sending device comprises means to implement groups of at least two real-value pilots. These means are driven by the microprocessor of the processing unit 62.

The processing unit 62 outputs the above-mentioned multicarrier signal.

As illustrated in FIG. 6B, a receiving device of this kind comprises a memory 64, a processing unit 65 equipped for example with a microprocessor µP and driven by the computer program 66 implementing the receiving method according to an embodiment of the invention.

At initialization, the code instructions of the computer program 66 are loaded for example into a RAM and then executed by the processor of the processing unit 65. At input, the processing unit 65 receives a received multicarrier signal y(t). The microprocessor of the processing unit 65 implements the steps of the receiving method described here, according to the instructions of the computer program 66, to estimate the transmission channel and decode the data received. To this end, the receiving device comprises means for extracting at least two complex values corresponding to the pilots of the group of said neighborhood region, after passing in said transmission channel, and means for estimating real and imaginary parts of said transmission channel in said neighborhood region from said complex values. These means are driven by the microprocessor of the processing unit 65.

2. Appendix A

Computation of the Constants $\beta_{m_0+p,n_0+q}^{(m_0,n_0)}$ Related to the Base Modulation Functions and to the Phase Here below we present a method for computing the real constants $\beta_{m_0+p,n_0+q}^{(m_0,n_0)}$ such as:

$$\hat{a}_{m_0,n_0}^{(i)} \approx \sum_{p,q \in \Omega_{P,Q}} \Im\{\beta_{m_0+p,n_0+q}^{(m_0,n_0)}\} a_{m_0+p,n_0+q}^{(r)} \quad (15)$$

where $\Im\{\beta_{m',n'}^{(m,n)}\}$ designates the imaginary part of $\beta_{m'n'}^{(m,n)}$.

It may be recalled first of all that the multicarrier signal sent can be written in the form:

$$s(t) = \sum_n \sum_{m=0}^{M-1} a_{m,n} \underbrace{g(t-n\tau_0)e^{j2\pi m\nu_0 t} e^{j\phi_{m,n}}}_{g_{m,n}(t)} \quad (16)$$

If it is also assumed that the transmission channel is perfect, in taking it for example to be equal to (1), at least locally, the estimate of the transmitted coefficients is given by:

$$\hat{a}_{m,n}^{(c)} \approx \sum_{n',m'} \left[\int f_{m,n}^*(t) g_{m',n'}(t) dt\right] a_{m',n'} \quad (17)$$

Assuming:

$$\beta_{m',n'}^{(m,n)} = \int f_{m,n}^*(t) g_{m',n'}(t) dt \quad (18),$$

we obtain, for the biorthogonal functions $f$ and $g$, $\Re\{\hat{a}_{m,n}^{(c)}\} = a_{m,n}$, giving:

$$\hat{a}_{m,n}^{(c)} = a_{m,n}^{(r)} + j\hat{a}_{m,n}^{(i)} \quad (19)$$

$$= a_{m,n} + j\Im\left\{\sum_{n',m'} \beta_{m',n'}^{(m,n)} a_{m',n'}\right\}$$

$$= a_{m,n} + j\sum_{n',m'} \Im\{\beta_{m',n'}^{(m,n)}\} a_{m',n'}$$

There therefore remains an interference term which can be evaluated for any pilot $(a_{m_0,n_0})$ in a neighborhood P×Q in evaluating $\beta_{m',n'}$.

It is also noted that:

$$\hat{a}_{m,n}^{(i)} = \sum_{n',m'} \Im\{\beta_{m',n'}^{(m,n)}\} a_{m',n'}. \quad (20)$$

Developing the expression of the base modulation functions and demodulation functions, we obtain:

$$\beta_{m',n'}^{(m,n)} = e^{j(\phi_{m'n'}-\phi_{m,n})} \int f^*(t-n\tau_0) g(t-n'\tau_0) e^{j2\pi(m'-m)\nu_0 t} dt \quad (21)$$

In a neighborhood P×Q of $(m_0,n_0)$, this equation can be re-written in taking $m=m_0, n=n_0$, $m'=m_0+p$ and $n'=n_0+q$, giving:

$$\beta_{m_0+p,n_0+q}^{(m_0,n_0)} = e^{j(\phi_{m_0+p,n_0+q} - \phi_{m_0,n_0})} \int\int f^*(t-n_0\tau_0) g(t-(n_0+p)\tau_0) e^{j2\pi p v_0 t} dt \quad (22)$$

$$\beta_{m_0+p,n_0+q}^{(m_0,n_0)} = (-1)^{nqp} e^{j(\phi m_0+p,n_0+q - \phi_{m_0,n_0})} \int\int f^*(t) g(t-p\tau_0) e^{j2\pi p v_0 t} dt \quad (23)$$

It is therefore noted that the coefficients β can be obtained from the cross ambiguity function of $f$ and g in the biorthogonal case or from the ambiguity function of g in the orthogonal case.

For its numerical evaluation, $f$ and g being obtained with finite-length filters, this computation is more precise if it is done directly in discrete form:

$$\beta_{m_0+p,n_0+q}^{(m_0,n_0)} = \quad (24)$$

$$(-1)^{n_0 p} e^{j(\phi_{m_0+p,n_0+q} - \phi_{m_0,n_0})} \sum_k f^*[k] g[k-qN] e^{j\frac{2\pi}{2N} p(k-\frac{D}{2})}$$

with $D = \alpha N - \gamma$ and $M = 2N$.

For its implantation on the reception side of a trans-multiplexer, it is preferable to take account of the fact that these coefficients have to be applied in taking account of a delay of α samples.

Here below, we present two examples of the determining of the coefficients β, in the context of an OFDM/OQAM type modulation having a real and even-parity continuous prototype function.

1. Phase defined by $\phi_{m,n} = \frac{\pi}{2}(n+m)$

Assuming:

$$\phi_{m,n} = \frac{\pi}{2}(n+m), \quad (25)$$

the equation (22) becomes:

$$\beta_{m_0+p,n_0+q}^{(m_0,n_0)} = (-1)^{n_0 p} e^{j\frac{\pi}{2}(p+q)} \int g(t) g(t-q\tau_0) e^{j2\pi p v_0 t} dt. \quad (26)$$

We then introduce the ambiguity function of a function x with the notation used in the patent document WO 02/25884 mentioned here above:

$$A_x(\tau, v) = \int x\left(t+\frac{\tau}{2}\right) \cdot x^*\left(t-\frac{\tau}{2}\right) e^{-j2\pi v t} dt$$

In changing the variable $$t = t' + \frac{q\tau_0}{2}$$

in the equation (26), we obtain:

$$\beta_{m_0+p,n_0+q}^{(m_0,n_0)} = (-1)^{n_0 p} e^{j\frac{\pi}{2}(p+q)} \int g\left(t+\frac{q\tau_0}{2}\right) g\left(t-\frac{q\tau_0}{2}\right) e^{j2\pi p v_0 (t+\frac{q\tau_0}{2})} dt$$

It being known that $$v_0 \tau_0 = \frac{1}{2},$$

the following is then obtained:

$$\beta_{m_0+p,n_0+q}^{(m_0,n_0)} = -(-1)^{n_0 p} e^{j\frac{\pi}{2}((p+q)+pq)} A(q\tau_0, p v_0).$$

Given that in this precise case, the function A is real, it is then possible to verify that the coefficient $\beta_{p,q}$ is a pure imaginary value.

2. Phase defined by $\phi_{m,n} = \frac{\pi}{2}(n+m) + \pi nm$

In performing the same computation as here above assuming $$\phi_{m,n} = \frac{\pi}{2}(n+m) + \pi nm,$$

we obtain:

$$\beta_{m_0+p,n_0+q}^{(m_0,n_0)} = -(-1)^{m_0 q + pq} e^{j\frac{\pi}{2}((p+q)+pq)} A(q\tau_0, p v_0)$$

Although the present disclosure has been described with reference to one or more examples, workers skilled in the art will recognize that changes may be made in form and detail without departing from the scope of the disclosure and/or the appended claims.

The invention claimed is:
1. A device for receiving a received signal corresponding to a multicarrier signal implementing an OQAM type modulation, sent out by at least one sender through a transmission channel, said multicarrier signal being formed by a temporal succession of symbols formed by a set of data elements comprising:
real-value informative data elements, and
for at least certain of said symbols, reference data elements, called pilots, known to at least one receiver designed to perform a reception of said multicarrier signal,
each of said data elements modulating a carrier frequency of said signal, a carrier frequency modulated by one of said data elements being called a carrier, wherein groups of at least two pilots, each located in a region known as a neighborhood region in the time/frequency space, a neighborhood region being a region in which said transmission channel is considered to be roughly constant, at least one of said groups comprising at least one real- value pilot and at least one pure-imaginary-value pilot, wherein said device comprises, for at least one of said neighborhood regions:

means for extracting at least two complex values corresponding to the pilots of the group of said neighborhood region, after passage through said transmission channel, means for estimating said real and imaginary parts of said transmission channel in said neighborhood region from said complex values by implementing a resolution of a system of four equations with four unknown quantities for each group of said at least two pilots, which comprises, for said group comprising at least one real-value pilot and at least one pure-imaginary-value pilot:

$$y_{m_0,n_0}^{(r)} = H_{m_0,n_0}^{(r)} a_{m_0,n_0}^{(r)} - C H_{m_0,n_0}^{(r)} a_{m_0,n_0}^{(i)}$$

$$y_{m_0,n_0}^{(i)} = C H_{m_0,n_0}^{(r)} a_{m_0,n_0}^{(r)} + H_{m_0,n_0}^{(r)} a_{m_0,n_0}^{(i)}$$

$$y_{m_1,n_1}^{(r)} = -\text{sign}(a_{m_1,n_1}^{(i)})(|a_{m_1,n_1}^{(r)}| + |a_{m_1,n_1}^{(i)}|) C H_{m_1,n_1}^{(r)}$$

$$y_{m_1,n_1}^{(i)} = \text{sign}(a_{m_1,n_1}^{(i)})(|a_{m_1,n_1}^{(r)}| + |a_{m_1,n_1}^{(i)}|) H_{m_1,n_1}^{(r)}$$

with:
- $(m_0,n_0)$ a first location of the time/frequency space and $(m_1,n_1)$ a second location of the time/frequency space in the neighborhood region,
- $y_{m_0,n_0}^{(r)}$ and $y_{m_0,n_0}^{(i)}$ real values respectively equal to the real part and to the imaginary part of the complex value of the signal received at $(m_0,n_0)$,
- $y_{m_1,n_1}^{(r)}$ and $y_{m_1,n_1}^{(i)}$ real values equal respectively to the real part and to the imaginary part of the complex value of the carrier situated at the location $(m_1,n_1)$,
- $H_{m_0,n_0}^{(r)}$ the real part of the complex value of said transmission channel at the location $(m_0,n_0)$ and $H_{m_1,n_1}^{(r)}$ the real part of the complex value of said transmission channel at the location $(m_1,n_1)$ with $H_{m_1,n_1}^{(r)}$ equal to $H_{m_0,n_0}^{(r)}$, the transmission channel being considered to be roughly constant in said neighborhood region,
- $a_{m_0,n_0}^{(r)}$ and $a_{m_0,n_0}^{(i)}$ being real values equal respectively to the real part and to the imaginary part of the complex value of said real-value pilot of the group of said neighborhood region at the position $(m_0,n_0)$,
- $a_{m_1,n_1}^{(i)}$ the imaginary part of the interference induced by said information elements neighboring said pure-imaginary-value pilot of the group of said neighborhood region at the position $(m_1,n_1)$,
- $ja_{m_1,n_1}^{(r)}$ the imaginary value received of said pure-imaginary-value pilot of the group of said neighborhood region at the position $(m_1,n_1)$, and
- C a real number.

2. A non-transitory computer readable medium comprising program code instructions that, when executed by a processor, implement a method of receiving a received signal corresponding to a multicarrier signal implementing an OQAM type modulation, sent by at least one sender device through a transmission channel, said multicarrier signal being formed by a temporal succession of symbols formed by a set of data elements comprising:

real-value informative data elements, and for at least certain of said symbols, reference data elements, called pilots, known to at least one receiver designed to make a reception of said multicarrier signal, each of said data elements modulating a carrier frequency of said signal, a carrier frequency modulated by one of said data elements being called a carrier, wherein groups of at least two pilots, each located in a region known as a neighborhood region in the time/frequency space, a neighborhood region being a region in which said transmission channel is considered to be roughly constant, at least one of said groups comprising at least one real-value pilot and at least one pure-imaginary-value pilot, and wherein said method comprises, for at least one of said neighborhood regions:

a step of extracting at least two complex values corresponding to the pilots of the group of said neighborhood region, after passage through said transmission channel, a step of estimating the real and imaginary parts of said transmission channel in said neighborhood region from said complex values by implementing a resolution of a system of four equations with four unknown quantities for each group of said at least two pilots, which comprises, for said group comprising at least one real-value pilot and at least one pure-imaginary-value pilot:

$$y_{m_0,n_0}^{(r)} = H_{m_0,n_0}^{(r)} a_{m_0,n_0}^{(r)} - C H_{m_0,n_0}^{(r)} a_{m_0,n_0}^{(i)}$$

$$y_{m_0,n_0}^{(i)} = C H_{m_0,n_0}^{(r)} a_{m_0,n_0}^{(r)} + H_{m_0,n_0}^{(r)} a_{m_0,n_0}^{(i)}$$

$$y_{m_1,n_1}^{(r)} = -\text{sign}(a_{m_1,n_1}^{(i)})(|a_{m_1,n_1}^{(r)}| + |a_{m_1,n_1}^{(i)}|) C H_{m_1,n_1}^{(r)}$$

$$y_{m_1,n_1}^{(i)} = \text{sign}(a_{m_1,n_1}^{(i)})(|a_{m_1,n_1}^{(r)}| + |a_{m_1,n_1}^{(i)}|) H_{m_1,n_1}^{(r)}$$

with:
- $(m_0,n_0)$ a first location of the time/frequency space and $(m_1,n_1)$ a second location of the time/frequency space in the neighborhood region,
- $y_{m_0,n_0}^{(r)}$ and $y_{m_0,n_0}^{(i)}$ real values respectively equal to the real part and to the imaginary part of the complex value of the signal received at $(m_0,n_0)$,
- $y_{m_1,n_1}^{(r)}$ and $y_{m_1,n_1}^{(i)}$ real values equal respectively to the real part and to the imaginary part of the complex value of the carrier situated at the location $(m_1,n_1)$
- $H_{m_0,n_0}^{(r)}$ the real part of the complex value of said transmission channel at the location $(m_0,n_0)$ and $H_{m_1,n_1}^{(r)}$ the real part of the complex value of said transmission channel at the location $(m_1,n_1)$ with $H_{m_1,n_1}^{(r)}$ equal to $H_{m_0,n_0}^{(r)}$, the transmission channel being considered to be roughly constant in said neighborhood region,
- $a_{m_0,n_0}^{(r)}$ and $a_{m_0,n_0}^{(i)}$ being real values equal respectively to the real part and to the imaginary part of the complex value of said real-value pilot of the group of said neighborhood region at the position $(m_0,n_0)$,
- $a_{m_1,n_1}^{(i)}$ the imaginary part of the interference induced by said information elements neighboring said pure-imaginary-value pilot of the group of said neighborhood region at the position $(m_1,n_1)$
- $ja_{m_1,n_1}^{(r)}$ the imaginary value received of said pure-imaginary-value pilot of the group of said neighborhood region at the position $(m_1,n_1)$, and
- C a real number.

3. A device comprising:

means for generating a multicarrier signal implementing an OQAM type modulation intended for transmission through a transmission channel and formed by a temporal succession of symbols formed by a set of data elements comprising:

real-value informative data elements, and for at least certain of said symbols, reference data elements, called pilots, known to at least one receiver designed to carry out a reception of said multicarrier signal, each of said data elements modulating a carrier frequency of said signal, a carrier frequency modulated by one of said data elements being called a carrier, means for implementing groups of at least two pilots, each located in a region known as a neighborhood region in the time/frequency space, a neighborhood region being a region in which said transmission channel is considered to be roughly constant, at least one of said groups comprising at least one real-value pilot and at least one pure-imaginary-value pilot, wherein at least one of said groups is configured to enable, for at least one of said neighborhood regions, at least two complex values corresponding to the pilots of the group of said neighborhood region to be extracted from the multicarrier signal and the real and imaginary parts of said transmission channel to be estimated in said neighborhood region from said complex values by implementing a resolution of a system of four equations with four unknown quantities for each group of said at least two pilots, which comprises, for said group comprising at least one real-value pilot and at least one pure-imaginary-value pilot:

$$y_{m_0,n_0}^{(r)} = H_{m_0,n_0}^{(r)} a_{m_0,n_0}^{(r)} - CH_{m_0,n_0}^{(r)} a_{m_0,n_0}^{(i)}$$

$$y_{m_0,n_0}^{(i)} = CH_{m_0,n_0}^{(r)} a_{m_0,n_0}^{(r)} + H_{m_0,n_0}^{(r)} a_{m_0,n_0}^{(i)}$$

$$y_{m_1,n_1}^{(r)} = -\text{sign}(a_{m_1,n_1}^{(i)})(|a_{m_1,n_1}^{(r)}| + |a_{m_1,n_1}^{(i)}|)CH_{m_1,n_1}$$

$$y_{m_1,n_1}^{(i)} = \text{sign}(a_{m_1,n_1}^{(i)})(|a_{m_1,n_1}^{(r)}| + |a_{m_1,n_1}^{(i)}|)H_{m_1,n_1}^{(r)}$$

with:

$(m_0, n_0)$ a first location of the time/frequency space and $(m_1, n_1)$ a second location of the time/frequency space in the neighborhood region, $y_{m_0,n_0}^{(r)}$ and $y_{m_0,n_0}^{(i)}$ real values respectively equal to the real part and to the imaginary part of the complex value of the signal received at $(m_0, n_0)$, $y_{m_1,n_1}^{(r)}$ and $y_{m_1,n_1}^{(i)}$ real values equal respectively to the real part and to the imaginary part of the complex value of the carrier situated at the location $(m_1, n_1)$, $H_{m_0,n_0}^{(r)}$ the real part of the complex value of said transmission channel at the location $(mo_0, n_0)$ and $H_{m_1,n_1}^{(r)}$ the real part of the complex value of said transmission channel at the location $(m_1, n_1)$ with $H_{m_1,n_1}^{(r)}$ equal to $H_{m_0,n_0}^{(r)}$, the transmission channel being considered to be roughly constant in said neighborhood region, $a_{m_0,n_0}^{(r)}$ and $a_{m_0,n_0}^{(i)}$ being real values equal respectively to the real part and to the imaginary part of the complex value of said real-value pilot of the group of said neighborhood region at the position $(m_0, n_0)$, $a_{m_1,n_1}^{(i)}$ the imaginary part of the interference induced by said information elements neighboring said pure-imaginary-value pilot of the group of said neighborhood region at the position $(m_1, n_1)$, $ja_{m_1,n_1}^{(r)}$ the imaginary value received of said pure-imaginary-value pilot of the group of said neighborhood region at the position $(m_1, n_1)$, and C a real number.

4. A non-transitory computer readable medium comprising program code instructions that, when executed by a processor, implement a method comprising sending a multicarrier signal implementing an OQAM type modulation intended for transmission through a transmission channel, and formed by a temporal succession of symbols formed by a set of data elements comprising:

real-value informative data elements, and for at least certain of said symbols, reference data elements, called pilots, known to at least one receiver designed to carry out a reception of said multicarrier signal, each of said data elements modulating a carrier frequency of said signal, a carrier frequency modulated by one of said data elements being called a carrier, wherein said sending method implements groups of at least two pilots, each located in a region known as a neighborhood region in the time/frequency space, a neighborhood region being a region in which said transmission channel is considered to be roughly constant, at least one of said groups comprising at least one real-value pilot and at least one pure-imaginary-value pilot, and wherein at least one of said groups is configured to enable, for at least one of said neighborhood regions, at least two complex values corresponding to the pilots of the group of said neighborhood region to be extracted from the multicarrier signal and the real and imaginary parts of said transmission channel to be estimated in said neighborhood region from said complex values by implementing a resolution of a system of four equations with four unknown quantities for each group of said at least two pilots, which comprises, for said group comprising at least one real-value pilot and at least one pure-imaginary-value pilot:

$$y_{m_0,n_0}^{(r)} = H_{m_0,n_0}^{(r)} a_{m_0,n_0}^{(r)} - CH_{m_0,n_0}^{(r)} a_{m_0,n_0}^{(i)}$$

$$y_{m_0,n_0}^{(i)} = CH_{m_0,n_0}^{(r)} a_{m_0,n_0}^{(r)} + H_{m_0,n_0}^{(r)} a_{m_0,n_0}^{(i)}$$

$$y_{m_1,n_1}^{(r)} = -\text{sign}(a_{m_1,n_1}^{(i)})(|a_{m_1,n_1}^{(r)}| + |a_{m_1,n_1}^{(i)}|)CH_{m_1,n_1}$$

$$y_{m_1,n_1}^{(i)} = \text{sign}(a_{m_1,n_1}^{(i)})(|a_{m_1,n_1}^{(r)}| + |a_{m_1,n_1}^{(i)}|)H_{m_1,n_1}^{(r)}$$

with:

$(m_0, n_0)$ a first location of the time/frequency space and $(m_1, n_1)$ a second location of the time/frequency space in the neighborhood region, $y_{m_0,n_0}^{(r)}$ and $y_{m_0,n_0}^{(i)}$ real values respectively equal to the real part and to the imaginary part of the complex value of the signal received at $(m_0, n_0)$, $y_{m_1,n_1}^{(r)}$ and $y_{m_1,n_1}^{(i)}$ real values equal respectively to the real part and to the imaginary part of the complex value of the carrier situated at the location $(m_1, n_1)$, $H_{m_0,n_0}^{(r)}$ the real part of the complex value of said transmission channel at the location $(m_0, n_0)$ and $H_{m_1,n_1}^{(r)}$ the real part of the complex value of said transmission channel at the location $(m_1, n_1)$ with $H_{m_1,n_1}^{(r)}$ equal to $H_{m_0,n_0}^{(r)}$, the transmission channel being considered to be roughly constant in said neighborhood region, $a_{m_0,n_0}^{(r)}$ and $a_{m_0,n_0}^{(i)}$ being real values equal respectively to the real part and to the imaginary part of the complex value of said real-value pilot of the group of said neighborhood region at the position $(m_0, n_0)$, $a_{m_1,n_1}^{(i)}$ the imaginary part of the interference induced by said information elements neighboring said pure-imaginary-value pilot of the group of said neighborhood region at the position $(m_1, n_1)$, $ja_{m_1,n_1}^{(r)}$ the imaginary value received of said pure-imaginary-value pilot of the group of said neighborhood region at the position $(m_1, n_1)$, and C a real number.

5. A method comprising:

generating a multicarrier signal implementing an OQAM type modulation formed by a temporal succession of symbols formed by a set of data elements comprising:
- real-value informative data elements, and
- for at least certain of said symbols, reference data elements, called pilots, known to at least one receiver designed to carry out a reception of said multicarrier signal,
- each of said data elements modulating a carrier frequency of said signal, a carrier frequency modulated by one of said data elements being called a carrier, wherein said set of data elements comprises groups of at least two pilots, each located in a region known as a neighborhood region in the time/frequency space, a neighborhood region being a region in which said transmission channel is considered to be roughly constant, at least one of said groups comprising of a pair of pilots comprising at least one real-value pilot and at least one pure-imaginary-value pilot, and wherein at least one of said groups is configured to enable, for at least one of said neighborhood regions, at least two complex values corresponding to the pilots of the group of said neighborhood region to be extracted from the multicarrier signal and the real and imaginary parts of said transmission channel to be estimated in said neighborhood region from said complex values by implementing a resolution of a system of four equations with four unknown quantities for each group of said at least two pilots, which comprises, for said group comprising at least one real-value pilot and at least one pure-imaginary-value pilot:

$$y_{m_0,n_0}^{(r)} = H_{m_0,n_0}^{(r)} a_{m_0,n_0}^{(r)} - CH_{m_0,n_0}^{(r)} a_{m_0,n_0}^{(i)}$$

$$y_{m_0,n_0}^{(i)} = CH_{m_0,n_0}^{(r)} a_{m_0,n_0}^{(r)} + H_{m_0,n_0}^{(r)} a_{m_0,n_0}^{(i)}$$

$$y_{m_1,n_1}^{(r)} = -\text{sign}(a_{m_1,n_1}^{(i)})(|a_{m_1,n_1}^{(r)}| + |a_{m_1,n_1}^{(i)}|) CH_{m_1,n_1}$$

$$y_{m_1,n_1}^{(i)} = \text{sign}(a_{m_1,n_1}^{(i)})(|a_{m_1,n_1}^{(r)}| + |a_{m_1,n_1}^{(i)}|) H_{m_1,n_1}^{(r)}$$

with:
- $(m_0, n_0)$ a first location of the time/frequency space and $(m_1, n_1)$ a second location of the time/frequency space in the neighborhood region,
- $y_{m_0,n_0}^{(r)}$ and $y_{m_0,n_0}^{(i)}$ real values respectively equal to the real part and to the imaginary part of the complex value of the signal received at $(m_0, n_0)$,
- $y_{m_1,n_1}^{(r)}$ and $y_{m_1,n_1}^{(i)}$ real values equal respectively to the real part and to the imaginary part of the complex value of the carrier situated at the location $(m_1, n_1)$,
- $H_{m_0,n_0}^{(r)}$ the real part of the complex value of said transmission channel at the location $(m_0, n_0)$ and $H_{m_1,n_1}^{(r)}$ the real part of the complex value of said transmission channel at the location $(m_1, n_1)$ with $H_{m_1,n_1}^{(r)}$ equal to $H_{m_0,n_0}^{(r)}$, the transmission channel being considered to be roughly constant in said neighborhood region,
- $a_{m_0,n_0}^{(r)}$ and $a_{m_0,n_0}^{(i)}$ being real values equal respectively to the real part and to the imaginary part of the complex value of said real-value pilot of the group of said neighborhood region at the position $(m_0, n_0)$,
- $a_{m_1,n_1}^{(i)}$ the imaginary part of the interference induced by said information elements neighboring said pure-imaginary-value pilot of the group of said neighborhood region at the position $(m_1, n_1)$,
- $ja_{m_1,n_1}^{(r)}$ the imaginary value received of said pure-imaginary-value pilot of the group of said neighborhood region at the position $(m_1, n_1)$, and
- C a real number; and transmitting the multicarrier signal.

6. A method for receiving a received signal corresponding to a multicarrier signal implementing an OQAM type modulation, sent by at least one sender device through a transmission channel, said multicarrier signal being formed by a temporal succession of symbols formed by a set of data elements comprising:
- real-value informative data elements, and
- for at least certain of said symbols, reference data elements, called pilots, known to at least one receiver designed to make a reception of said multicarrier signal,
- each of said data elements modulating a carrier frequency of said signal, a carrier frequency modulated by one of said data elements being called a carrier, wherein groups of at least two pilots, each located in a region known as a neighborhood region in the time/frequency space, a neighborhood region being a region in which said transmission channel is considered to be roughly constant, at least one of said groups comprising at least one real-value pilot and at least one pure-imaginary-value pilot, and wherein said method comprises, for at least one of said neighborhood regions:
  - a step of extracting at least two complex values corresponding to the pilots of the group of said neighborhood region, after passage through said transmission channel, and
  - a step of estimating the real and imaginary parts of said transmission channel in said neighborhood region from said complex values, wherein said estimation step implements a resolution of a system of four equations with four unknown quantities for each group of said at least two pilots, which comprises, for said group comprising at least one real-value pilot and at least one pure-imaginary-value pilot:

$$y_{m_0,n_0}^{(r)} = H_{m_0,n_0}^{(r)} a_{m_0,n_0}^{(r)} - CH_{m_0,n_0}^{(r)} a_{m_0,n_0}^{(i)}$$

$$y_{m_0,n_0}^{(i)} = CH_{m_0,n_0}^{(r)} a_{m_0,n_0}^{(r)} + H_{m_0,n_0}^{(r)} a_{m_0,n_0}^{(i)}$$

$$y_{m_1,n_1}^{(r)} = -\text{sign}(a_{m_1,n_1}^{(i)})(|a_{m_1,n_1}^{(r)}| + |a_{m_1,n_1}^{(i)}|) CH_{m_1,n_1}$$

$$y_{m_1,n_1}^{(i)} = \text{sign}(a_{m_1,n_1}^{(i)})(|a_{m_1,n_1}^{(r)}| + |a_{m_1,n_1}^{(i)}|) H_{m_1,n_1}^{(r)}$$

with:
- $(m_0, n_0)$ a first location of the time/frequency space and $(m_1, n_1)$ a second location of the time/frequency space in the neighborhood region,
- $y_{m_0,n_0}^{(r)}$ and $y_{m_0,n_0}^{(i)}$ real values respectively equal to the real part and to the imaginary part of the complex value of the signal received at $(m_0, n_0)$,
- $y_{m_1,n_1}^{(r)}$ and $y_{m_1,n_1}^{(i)}$ real values equal respectively to the real part and to the imaginary part of the complex value of the carrier situated at the location $(m_1, n_1)$,
- $H_{m_0,n_0}^{(r)}$ the real part of the complex value of said transmission channel at the location $(m_0, n_0)$ and $H_{m_1,n_1}^{(r)}$ the real part of the complex value of said transmission channel at the location $(m_1, n_1)$ with $H_{m_1,n_1}^{(r)}$ equal to $H_{m_0,n_0}^{(r)}$, the transmission channel being considered to be roughly constant in said neighborhood region,
- $a_{m_0,n_0}^{(r)}$ and $a_{m_0,n_0}^{(i)}$ being real values equal respectively to the real part and to the imaginary part of the complex value of said real-value pilot of the group of said neighborhood region at the position $(m_0, n_0)$,
- $a_{m_1,n_1}^{(i)}$ the imaginary part of the interference induced by said information elements neighboring said pureimaginary-value pilot of the group of said neighborhood region at the position $(m_1,n_1)$, $ja_{m_1,n_1}^{(r)}$ the imaginary value received of said pure-imaginary-value pilot of the group of said neighborhood region at the position $(m_1,n_1)$, and C a real number.

7. Method for receiving according to claim 6, wherein each of said groups comprises of a pair of pilots.

8. Method for receiving according to claim 6, wherein said estimation step implements an intermediate computation of a ratio between said real and imaginary parts of said complex values.

9. Method for receiving according to claim 6, wherein the method comprises a step of eliminating an intrinsic interference induced by said pure-imaginary-value pilot.

10. A method comprising:

generating a multicarrier signal with a sending device by implementing an OQAM type modulation intended for transmission through a transmission channel, the multicarrier signal being formed by a temporal succession of symbols formed by a set of data elements comprising:

real-value informative data elements, and for at least certain of said symbols, reference data elements, called pilots, known to at least one receiver designed to carry out a reception of said multicarrier signal, wherein each of said data elements modulates a carrier frequency of said signal, a carrier frequency modulated by one of said data elements being called a carrier, wherein said sending method implements groups of at least two pilots, each located in a region known as a neighborhood region in the time/frequency space, a neighborhood region being a region in which said transmission channel is considered to be roughly constant, at least one of said groups comprising at least one real-value pilot and at least one pure-imaginary-value pilot, wherein at least one of said groups is configured to enable, for at least one of said neighborhood regions, at least two complex values corresponding to the pilots of the group of said neighborhood region to be extracted from the multicarrier signal and the real and imaginary parts of said transmission channel to be estimated in said neighborhood region from said complex values by implementing a resolution of a system of four equations with four unknown quantities for each group of said at least two pilots, which comprises, for said group comprising at least one real-value pilot and at least one pure-imaginary-value pilot:

$$y_{m_0,n_0}^{(r)}=H_{m_0,n_0}^{(r)}a_{m_0,n_0}^{(r)}-CH_{m_0,n_0}^{(r)}a_{m_0,n_0}^{(i)}$$

$$y_{m_0,n_0}^{(i)}=CH_{m_0,n_0}^{(r)}a_{m_0,n_0}^{(r)}+H_{m_0,n_0}^{(r)}a_{m_0,n_0}^{(i)}$$

$$y_{m_1,n_1}^{(r)}=-\text{sign}(a_{m_1,n_1}^{(i)})(|a_{m_1,n_1}^{(r)}|+|a_{m_1,n_1}^{(i)}|)CH_{m_1,n_1}^{(r)}$$

$$y_{m_1,n_1}^{(i)}=\text{sign}(a_{m_1,n_1}^{(i)})(|a_{m_1,n_1}^{(r)}|+|a_{m_1,n_1}^{(i)}|)H_{m_1,n_1}^{(r)}$$

with:

$(m_0,n_0)$ a first location of the time/frequency space and $(m_1,n_1)$ a second location of the time/frequency space in the neighborhood region, $y_{m_0,n_0}^{(r)}$ and $y_{m_0,n_0}^{(i)}$ real values respectively equal to the real part and to the imaginary part of the complex value of the signal received at $(m_0,n_0)$, $y_{m_1,n_1}^{(r)}$ and $y_{m_1,n_1}^{(i)}$ real values equal respectively to the real part and to the imaginary part of the complex value of the carrier situated at the location $(m_1,n_1)$, $H_{m_0,n_0}^{(r)}$ the real part of the complex value of said transmission channel at the location $(m_0,n_0)$ and $H_{m_1,n_1}^{(r)}$ the real part of the complex value of said transmission channel at the location $(m_1,n_1)$ with $H_{m_1,n_1}^{(r)}$ equal to $H_{m_0,n_0}^{(r)}$, the transmission channel being considered to be roughly constant in said neighborhood region, $a_{m_0,n_0}^{(r)}$ and $a_{m_0,n_0}^{(i)}$ being real values equal respectively to the real part and to the imaginary part of the complex value of said real-value pilot of the group of said neighborhood region at the position $(m_0,n_0)$, $a_{m_1,n_1}^{(i)}$ the imaginary part of the interference induced by said information elements neighboring said pure-imaginary-value pilot of the group of said neighborhood region at the position $(m_1,n_1)$, $ja_{m_1,n_1}^{(r)}$ the imaginary value received of said pure-imaginary-value pilot of the group of said neighborhood region at the position $(m_1,n_1)$, and C a real number; and sending the multicarrier signal with the sending device.

11. Method for sending according to claim 10, wherein each of said groups comprises of a pair of pilots.

12. Method for sending according to claim 10, wherein the method comprises a step of determining a nature of said pilots, said nature belonging to the group comprising the real nature and the pure imaginary nature.

13. Method for sending according to claim 10, wherein the method comprises a step of determining a sign of said imaginary-value pilot.

14. Method for sending according to claim 12, wherein the step of determining the nature of said pilots depends on the value of at least one of the informative data elements neighboring each of said pilot.

15. Method for sending according to claim 13, wherein the sign of said pure-imaginary-value pilot is the same as the sign of the value of an interference term induced by said informative data elements neighboring said pilot on said pilot.

16. Method for sending according to claim 13, wherein the step of determining the sign of said imaginary-value pilot depends on the value of at least one of the informative data elements neighboring each of said pilot.

* * * * *

UNITED STATES PATENT AND TRADEMARK OFFICE
CERTIFICATE OF CORRECTION

PATENT NO. : 8,194,531 B2
APPLICATION NO. : 12/373458
DATED : June 5, 2012
INVENTOR(S) : Chrislin Lele et al.

It is certified that error appears in the above-identified patent and that said Letters Patent is hereby corrected as shown below:

Claims

In claim 1, column 23, lines 16–23, delete

" $y_{m_0,n_0}^{(r)} = H_{m_0,n_0}^{(r)} a_{m_0,n_0}^{(r)} - CH_{m_0,n_0}^{(r)} a_{m_0,n_0}^{(i)}$ $y_{m_0,n_0}^{(i)} = CH_{m_0,n_0}^{(r)} a_{m_0,n_0}^{(r)} + H_{m_0,n_0}^{(r)} a_{m_0,n_0}^{(i)}$ $y_{m_1,n_1}^{(r)} = -\text{sign}(a_{m_1,n_1}^{(i)})(|a_{m_1,n_1}^{(r)}| + |a_{m_1,n_1}^{(i)}|) CH_{m_1,n_1}^{(r)}$ $y_{m_1,n_1}^{(i)} = \text{sign}(a_{m_1,n_1}^{(i)})(|a_{m_1,n_1}^{(r)}| + |a_{m_1,n_1}^{(i)}|) H_{m_1,n_1}^{(r)}$ ,"

and insert

-- $\begin{cases} y_{m_0,n_0}^{(r)} = H_{m_0,n_0}^{(r)} a_{m_0,n_0}^{(r)} - CH_{m_0,n_0}^{(r)} a_{m_0,n_0}^{(i)} \\ y_{m_0,n_0}^{(i)} = CH_{m_0,n_0}^{(r)} a_{m_0,n_0}^{(r)} + H_{m_0,n_0}^{(r)} a_{m_0,n_0}^{(i)} \\ y_{m_1,n_1}^{(r)} = -\text{sign}(a_{m_1,n_1}^{(i)})(|a_{m_1,n_1}^{(r)}| + |a_{m_1,n_1}^{(i)}|) CH_{m_1,n_1}^{(r)} \\ y_{m_1,n_1}^{(i)} = \text{sign}(a_{m_1,n_1}^{(i)})(|a_{m_1,n_1}^{(r)}| + |a_{m_1,n_1}^{(i)}|) H_{m_1,n_1}^{(r)} \end{cases}$ --.

Signed and Sealed this
Twelfth Day of April, 2016

Michelle K. Lee
*Director of the United States Patent and Trademark Office*

Claims

In claim 2, column 24, lines 22–28, delete $y_{m_0,n_0}^{(r)} = H_{m_0,n_0}^{(r)} a_{m_0,n_0}^{(r)} - CH_{m_0,n_0}^{(r)} a_{m_0,n_0}^{(i)}$ $y_{m_0,n_0}^{(i)} = CH_{m_0,n_0}^{(r)} a_{m_0,n_0}^{(r)} + H_{m_0,n_0}^{(r)} a_{m_0,n_0}^{(i)}$ $y_{m_1,n_1}^{(r)} = -sign(a_{m_1,n_1}^{(i)})(|a_{m_1,n_1}^{(r)}| + |a_{m_1,n_1}^{(i)}|) CH_{m_1,n_1}^{(r)}$ " $y_{m_1,n_1}^{(i)} = sign(a_{m_1,n_1}^{(i)})(|a_{m_1,n_1}^{(r)}| + |a_{m_1,n_1}^{(i)}|) H_{m_1,n_1}^{(r)}$ ", and insert -- $$\begin{cases} y_{m_0,n_0}^{(r)} = H_{m_0,n_0}^{(r)} a_{m_0,n_0}^{(r)} - CH_{m_0,n_0}^{(r)} a_{m_0,n_0}^{(i)} \\ y_{m_0,n_0}^{(i)} = CH_{m_0,n_0}^{(r)} a_{m_0,n_0}^{(r)} + H_{m_0,n_0}^{(r)} a_{m_0,n_0}^{(i)} \\ y_{m_1,n_1}^{(r)} = -sign(a_{m_1,n_1}^{(i)})(|a_{m_1,n_1}^{(r)}| + |a_{m_1,n_1}^{(i)}|) CH_{m_1,n_1}^{(r)} \\ y_{m_1,n_1}^{(i)} = sign(a_{m_1,n_1}^{(i)})(|a_{m_1,n_1}^{(r)}| + |a_{m_1,n_1}^{(i)}|) H_{m_1,n_1}^{(r)} \end{cases}$$ --.

In claim 3, column 25, lines 24–31, delete $y_{m_0,n_0}^{(r)} = H_{m_0,n_0}^{(r)} a_{m_0,n_0}^{(r)} - CH_{m_0,n_0}^{(r)} a_{m_0,n_0}^{(i)}$ $y_{m_0,n_0}^{(i)} = CH_{m_0,n_0}^{(r)} a_{m_0,n_0}^{(r)} + H_{m_0,n_0}^{(r)} a_{m_0,n_0}^{(i)}$ $y_{m_1,n_1}^{(r)} = -sign(a_{m_1,n_1}^{(i)})(|a_{m_1,n_1}^{(r)}| + |a_{m_1,n_1}^{(i)}|) CH_{m_1,n_1}^{(r)}$ " $y_{m_1,n_1}^{(i)} = sign(a_{m_1,n_1}^{(i)})(|a_{m_1,n_1}^{(r)}| + |a_{m_1,n_1}^{(i)}|) H_{m_1,n_1}^{(r)}$ ", and insert -- $$\begin{cases} y_{m_0,n_0}^{(r)} = H_{m_0,n_0}^{(r)} a_{m_0,n_0}^{(r)} - CH_{m_0,n_0}^{(r)} a_{m_0,n_0}^{(i)} \\ y_{m_0,n_0}^{(i)} = CH_{m_0,n_0}^{(r)} a_{m_0,n_0}^{(r)} + H_{m_0,n_0}^{(r)} a_{m_0,n_0}^{(i)} \\ y_{m_1,n_1}^{(r)} = -sign(a_{m_1,n_1}^{(i)})(|a_{m_1,n_1}^{(r)}| + |a_{m_1,n_1}^{(i)}|) CH_{m_1,n_1}^{(r)} \\ y_{m_1,n_1}^{(i)} = sign(a_{m_1,n_1}^{(i)})(|a_{m_1,n_1}^{(r)}| + |a_{m_1,n_1}^{(i)}|) H_{m_1,n_1}^{(r)} \end{cases}$$ --.

Claims

In claim 4, column 26, lines 30–39, delete $y_{m_0,n_0}^{(r)} = H_{m_0,n_0}^{(r)} a_{m_0,n_0}^{(r)} - CH_{m_0,n_0}^{(r)} a_{m_0,n_0}^{(i)}$ $y_{m_0,n_0}^{(i)} = CH_{m_0,n_0}^{(r)} a_{m_0,n_0}^{(r)} + H_{m_0,n_0}^{(r)} a_{m_0,n_0}^{(i)}$ $y_{m_1,n_1}^{(r)} = -\text{sign}(a_{m_1,n_1}^{(i)})(|a_{m_1,n_1}^{(r)}| + |a_{m_1,n_1}^{(i)}|) CH_{m_1,n_1}^{(r)}$ " $y_{m_1,n_1}^{(i)} = \text{sign}(a_{m_1,n_1}^{(i)})(|a_{m_1,n_1}^{(r)}| + |a_{m_1,n_1}^{(i)}|) H_{m_1,n_1}^{(r)}$ ,, and insert $$\begin{cases} y_{m_0,n_0}^{(r)} = H_{m_0,n_0}^{(r)} a_{m_0,n_0}^{(r)} - CH_{m_0,n_0}^{(r)} a_{m_0,n_0}^{(i)} \\ y_{m_0,n_0}^{(i)} = CH_{m_0,n_0}^{(r)} a_{m_0,n_0}^{(r)} + H_{m_0,n_0}^{(r)} a_{m_0,n_0}^{(i)} \\ y_{m_1,n_1}^{(r)} = -\text{sign}(a_{m_1,n_1}^{(i)})(|a_{m_1,n_1}^{(r)}| + |a_{m_1,n_1}^{(i)}|) CH_{m_1,n_1}^{(r)} \\ y_{m_1,n_1}^{(i)} = \text{sign}(a_{m_1,n_1}^{(i)})(|a_{m_1,n_1}^{(r)}| + |a_{m_1,n_1}^{(i)}|) H_{m_1,n_1}^{(r)} \end{cases}$$

-- --.

In claim 5, column 27, lines 33–40, delete $y_{m_0,n_0}^{(r)} = H_{m_0,n_0}^{(r)} a_{m_0,n_0}^{(r)} - CH_{m_0,n_0}^{(r)} a_{m_0,n_0}^{(i)}$ $y_{m_0,n_0}^{(i)} = CH_{m_0,n_0}^{(r)} a_{m_0,n_0}^{(r)} + H_{m_0,n_0}^{(r)} a_{m_0,n_0}^{(i)}$ $y_{m_1,n_1}^{(r)} = -\text{sign}(a_{m_1,n_1}^{(i)})(|a_{m_1,n_1}^{(r)}| + |a_{m_1,n_1}^{(i)}|) CH_{m_1,n_1}$ " $y_{m_1,n_1}^{(i)} = \text{sign}(a_{m_1,n_1}^{(i)})(|a_{m_1,n_1}^{(r)}| + |a_{m_1,n_1}^{(i)}|) H_{m_1,n_1}^{(r)}$ ,, and insert $$\begin{cases} y_{m_0,n_0}^{(r)} = H_{m_0,n_0}^{(r)} a_{m_0,n_0}^{(r)} - CH_{m_0,n_0}^{(r)} a_{m_0,n_0}^{(i)} \\ y_{m_0,n_0}^{(i)} = CH_{m_0,n_0}^{(r)} a_{m_0,n_0}^{(r)} + H_{m_0,n_0}^{(r)} a_{m_0,n_0}^{(i)} \\ y_{m_1,n_1}^{(r)} = -\text{sign}(a_{m_1,n_1}^{(i)})(|a_{m_1,n_1}^{(r)}| + |a_{m_1,n_1}^{(i)}|) CH_{m_1,n_1}^{(r)} \\ y_{m_1,n_1}^{(i)} = \text{sign}(a_{m_1,n_1}^{(i)})(|a_{m_1,n_1}^{(r)}| + |a_{m_1,n_1}^{(i)}|) H_{m_1,n_1}^{(r)} \end{cases}$$

-- --.

Claims

In claim 6, column 28, lines 38–45, delete $$y_{m_0,n_0}^{(r)} = H_{m_0,n_0}^{(r)} a_{m_0,n_0}^{(r)} - CH_{m_0,n_0}^{(r)} a_{m_0,n_0}^{(i)}$$

$$y_{m_0,n_0}^{(i)} = CH_{m_0,n_0}^{(r)} a_{m_0,n_0}^{(r)} + H_{m_0,n_0}^{(r)} a_{m_0,n_0}^{(i)}$$

$$y_{m_1,n_1}^{(r)} = -sign(a_{m_1,n_1}^{(i)})(|a_{m_1,n_1}^{(r)}| + |a_{m_1,n_1}^{(i)}|)CH_{m_1,n_1}^{(r)}$$

$$y_{m_1,n_1}^{(i)} = sign(a_{m_1,n_1}^{(i)})(|a_{m_1,n_1}^{(r)}| + |a_{m_1,n_1}^{(i)}|)H_{m_1,n_1}^{(r)}$$

and insert $$\begin{cases} y_{m_0,n_0}^{(r)} = H_{m_0,n_0}^{(r)} a_{m_0,n_0}^{(r)} - CH_{m_0,n_0}^{(r)} a_{m_0,n_0}^{(i)} \\ y_{m_0,n_0}^{(i)} = CH_{m_0,n_0}^{(r)} a_{m_0,n_0}^{(r)} + H_{m_0,n_0}^{(r)} a_{m_0,n_0}^{(i)} \\ y_{m_1,n_1}^{(r)} = -sign(a_{m_1,n_1}^{(i)})(|a_{m_1,n_1}^{(r)}| + |a_{m_1,n_1}^{(i)}|)CH_{m_1,n_1}^{(r)} \\ y_{m_1,n_1}^{(i)} = sign(a_{m_1,n_1}^{(i)})(|a_{m_1,n_1}^{(r)}| + |a_{m_1,n_1}^{(i)}|)H_{m_1,n_1}^{(r)} \end{cases}$$

In claim 10, column 29, lines 56–65 and column 30, lines 1–5, delete $$y_{m_0,n_0}^{(r)} = H_{m_0,n_0}^{(r)} a_{m_0,n_0}^{(r)} - CH_{m_0,n_0}^{(r)} a_{m_0,n_0}^{(i)}$$

$$y_{m_0,n_0}^{(i)} = CH_{m_0,n_0}^{(r)} a_{m_0,n_0}^{(r)} + H_{m_0,n_0}^{(r)} a_{m_0,n_0}^{(i)}$$

$$y_{m_1,n_1}^{(r)} = -sign(a_{m_1,n_1}^{(i)})(|a_{m_1,n_1}^{(r)}| + |a_{m_1,n_1}^{(i)}|)CH_{m_1,n_1}^{(r)}$$

$$y_{m_1,n_1}^{(i)} = sign(a_{m_1,n_1}^{(i)})(|a_{m_1,n_1}^{(r)}| + |a_{m_1,n_1}^{(i)}|)H_{m_1,n_1}^{(r)}$$

and insert $$\begin{cases} y_{m_0,n_0}^{(r)} = H_{m_0,n_0}^{(r)} a_{m_0,n_0}^{(r)} - CH_{m_0,n_0}^{(r)} a_{m_0,n_0}^{(i)} \\ y_{m_0,n_0}^{(i)} = CH_{m_0,n_0}^{(r)} a_{m_0,n_0}^{(r)} + H_{m_0,n_0}^{(r)} a_{m_0,n_0}^{(i)} \\ y_{m_1,n_1}^{(r)} = -sign(a_{m_1,n_1}^{(i)})(|a_{m_1,n_1}^{(r)}| + |a_{m_1,n_1}^{(i)}|)CH_{m_1,n_1}^{(r)} \\ y_{m_1,n_1}^{(i)} = sign(a_{m_1,n_1}^{(i)})(|a_{m_1,n_1}^{(r)}| + |a_{m_1,n_1}^{(i)}|)H_{m_1,n_1}^{(r)} \end{cases}$$